United States Patent
Le Saint

(10) Patent No.: US 8,302,171 B2
(45) Date of Patent: *Oct. 30, 2012

(54) SYSTEM AND METHOD FOR PRIVILEGE DELEGATION AND CONTROL

(75) Inventor: Eric F. Le Saint, Fremont, CA (US)

(73) Assignee: Activcard, Suresnes Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/804,146

(22) Filed: Jul. 14, 2010

(65) Prior Publication Data

US 2011/0093934 A1    Apr. 21, 2011

Related U.S. Application Data

(63) Continuation of application No. 10/218,642, filed on Aug. 15, 2002, now Pat. No. 7,770,212.

(51) Int. Cl.
*G06F 7/04* (2006.01)
(52) U.S. Cl. .................. 726/5; 705/41; 705/59; 726/10
(58) Field of Classification Search .............. 705/65; 709/229
See application file for complete search history.

(56) References Cited

U.S. PATENT DOCUMENTS

| 5,649,099 A | | 7/1997 | Theimer et al. | |
|---|---|---|---|---|
| 5,941,947 A | * | 8/1999 | Brown et al. | 709/225 |
| 6,192,349 B1 | * | 2/2001 | Husemann et al. | 705/65 |
| 6,678,733 B1 | * | 1/2004 | Brown et al. | 709/229 |
| 7,770,212 B2 | * | 8/2010 | Le Saint | 726/5 |
| 2002/0095571 A1 | * | 7/2002 | Bradee | 713/164 |
| 2002/0099952 A1 | | 7/2002 | Lambert et al. | |
| 2005/0262553 A1 | * | 11/2005 | Bialick et al. | 726/10 |

FOREIGN PATENT DOCUMENTS

| WO | WO 99/64947 | 12/1999 |
|---|---|---|
| WO | WO 02/39237 A2 | 5/2002 |

* cited by examiner

*Primary Examiner* — Charles C Agwumezie
(74) *Attorney, Agent, or Firm* — Muirhead and Saturnelli, LLC

(57) ABSTRACT

This invention provides a privilege delegation mechanism, which allows a privilege and associated control attributes to be delegated from a security token to another security token or an intelligent device such as a computer system. The privilege may be in the form of an attribute certificate, a key component of a cryptographic key, a complete cryptographic key, digital certificate, digital right, license or loyalty credits. The purpose of the delegation is to allow another security token or computer system to act as a surrogate for the security token or to access a resource which requires components from both units before access is permitted. Attributes associated with the delegated privilege control the scope and use of the privilege. The delegation may allow the surrogate to perform authentications, access data or resources included on another security token or computer system. Authentications are performed prior to transferring of the delegable privileges.

10 Claims, 25 Drawing Sheets

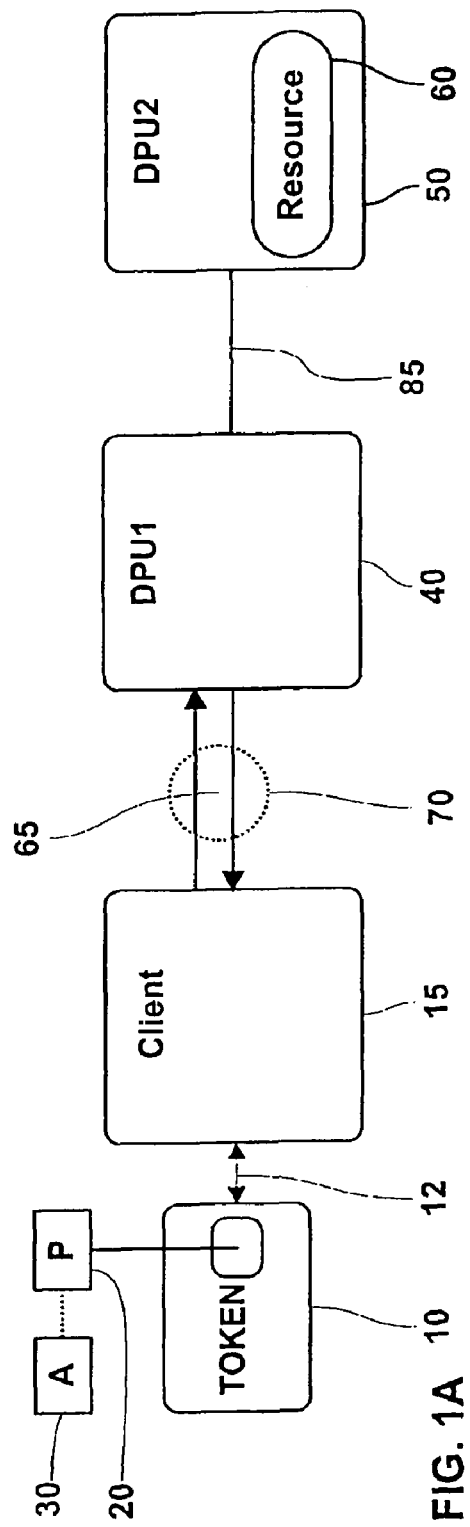
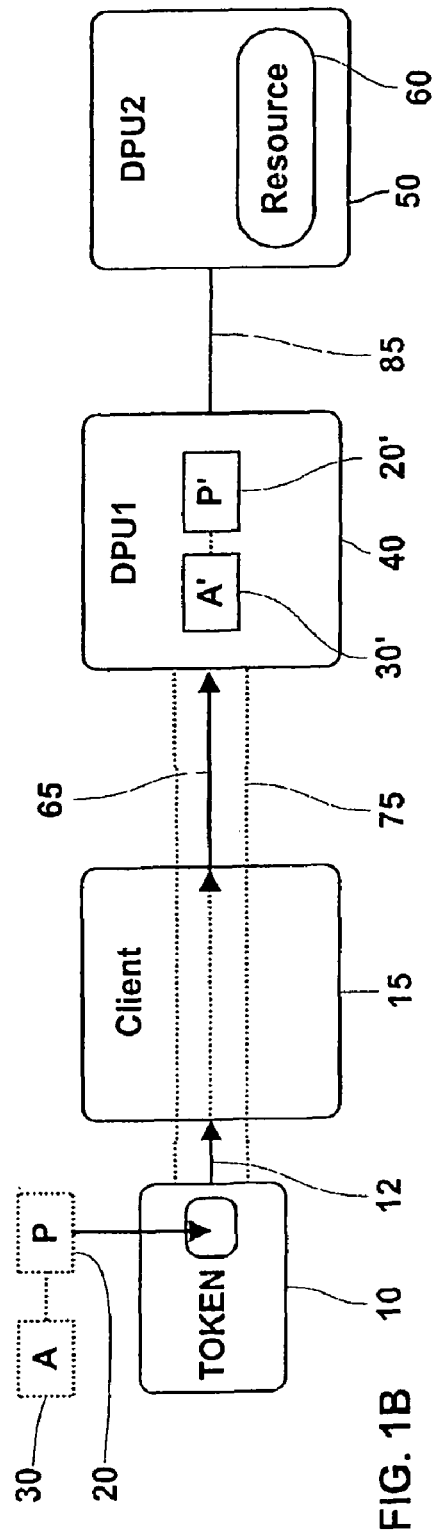
FIG. 1A
FIG. 1B

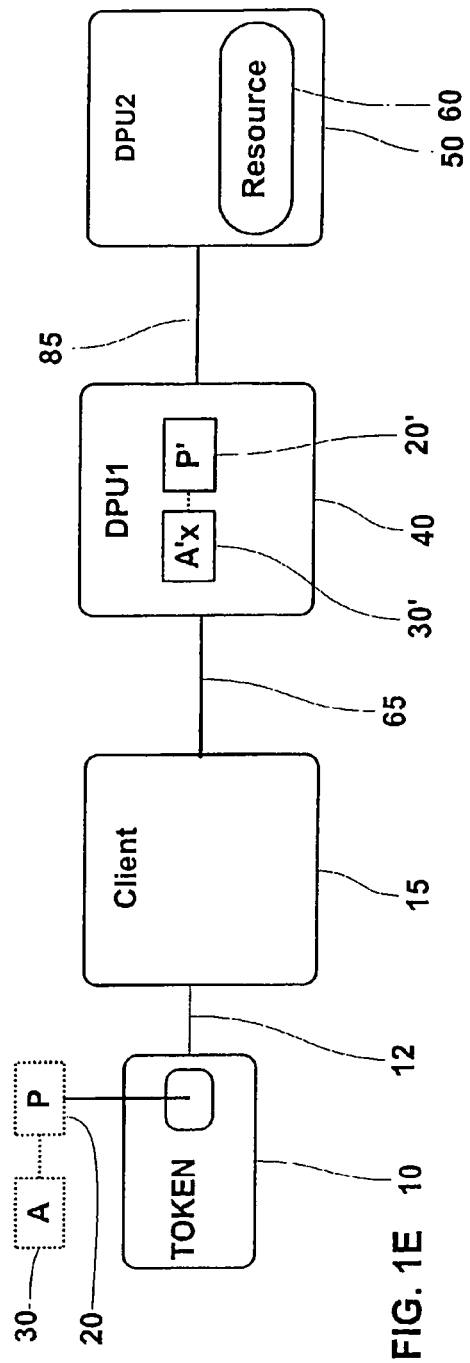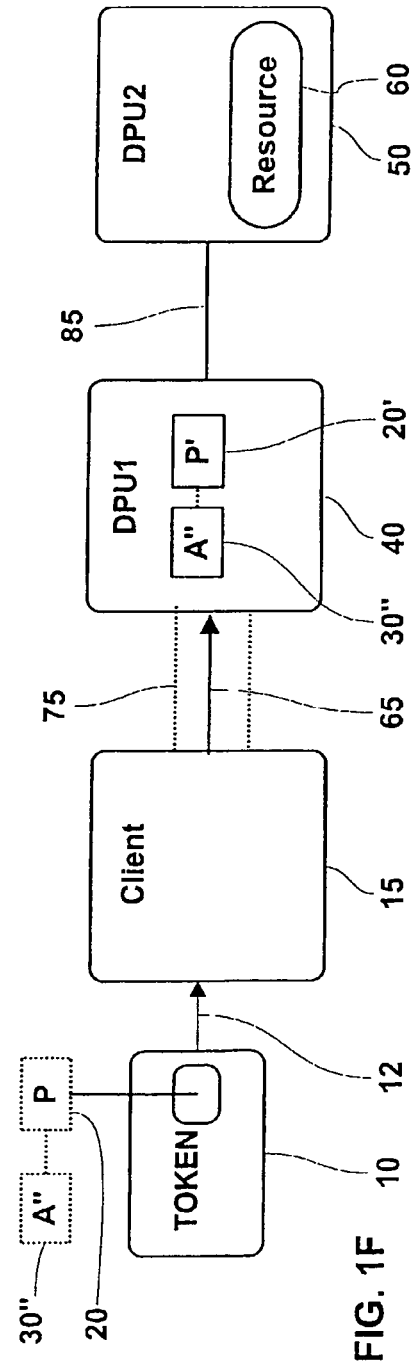
FIG. 1E
FIG. 1F

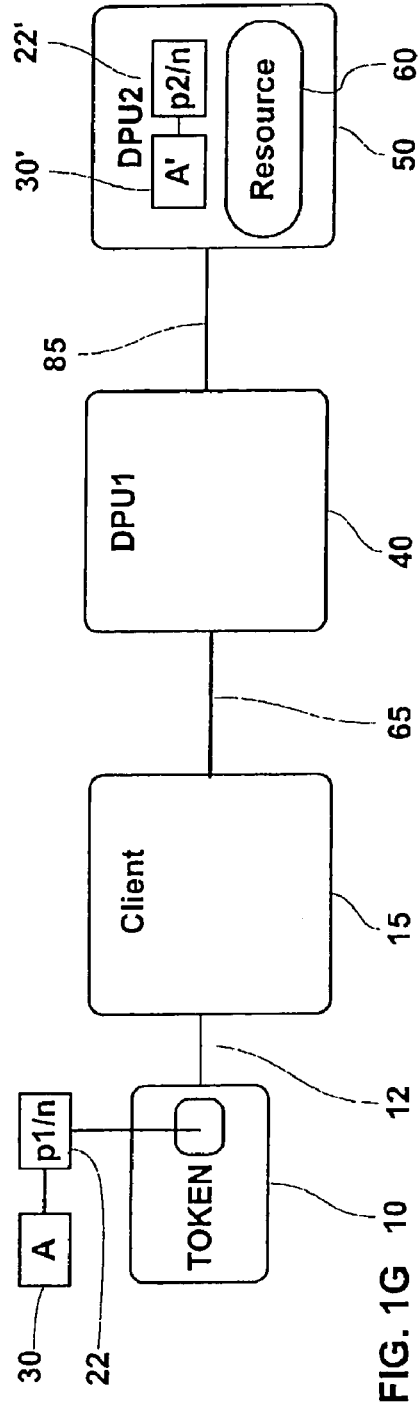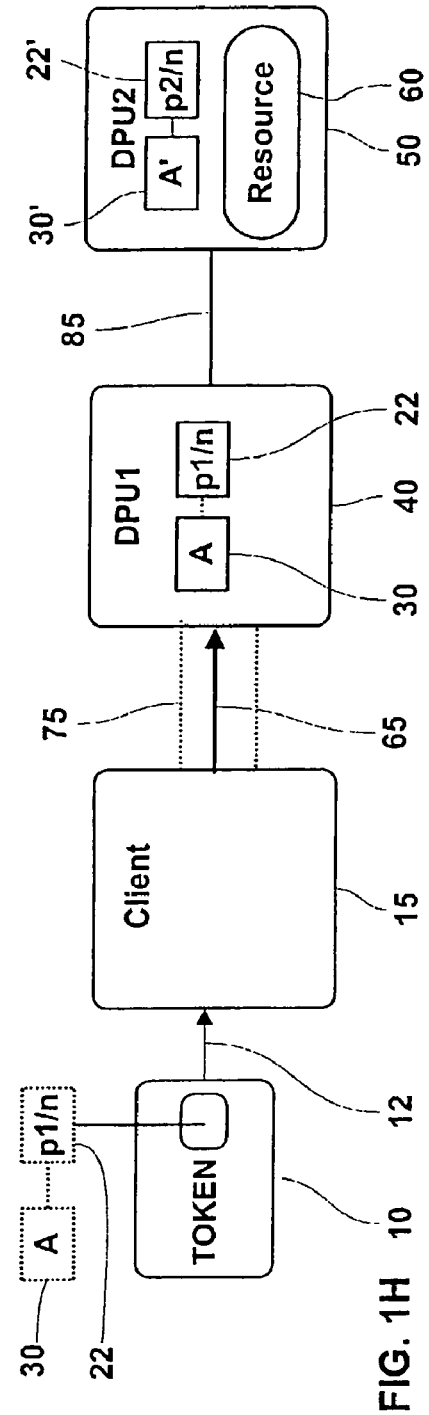

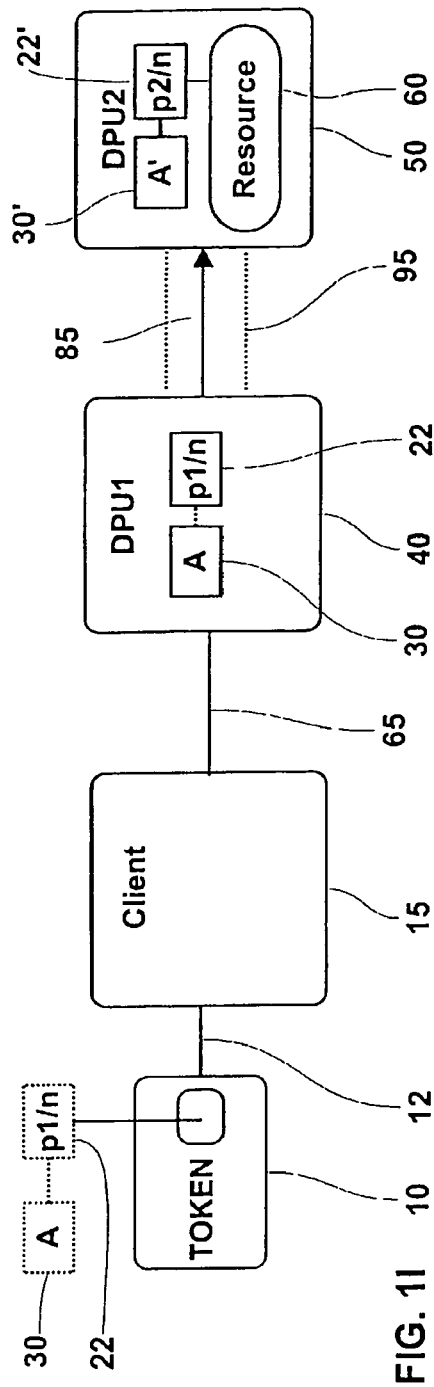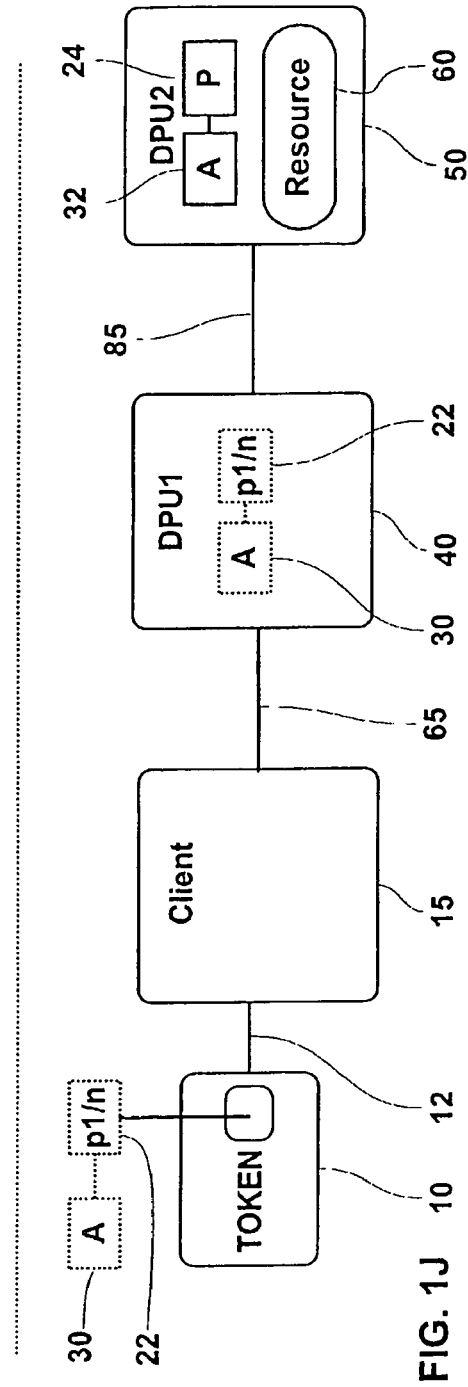

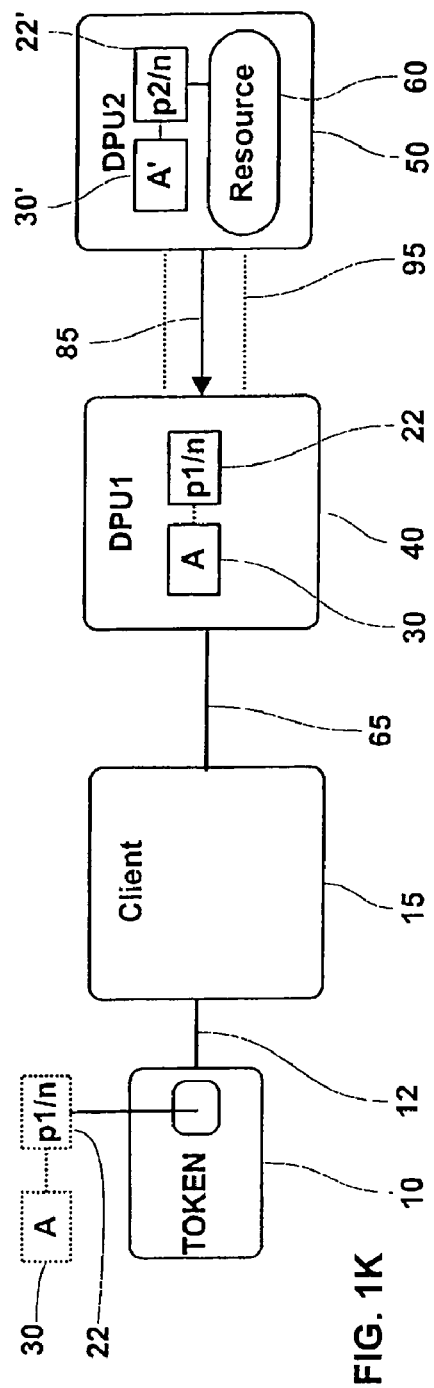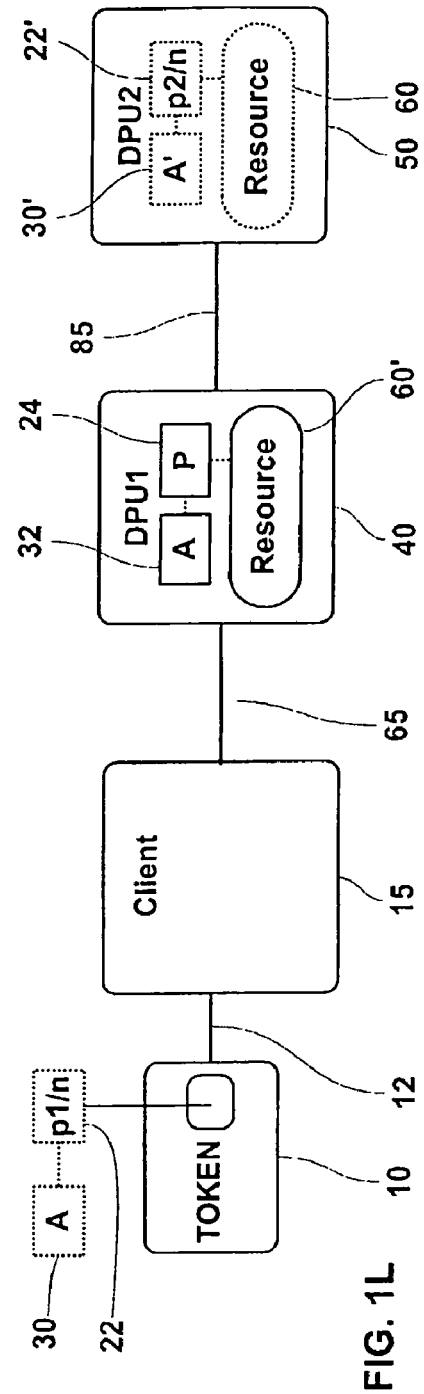

PRIVILEGES

- Key Component
- Cryptographic Key
- Privilege Attribute Certificate
- Digital Ticket
- Digital Credential
- Password
- Biometric Template
- Loyalty Credit

ATTRIBUTES

CONTROL ASPECTS

- Activate/Destroy
- Security Policies
- Validity Period
- Remaining # of Uses
- Time Limits
- Cryptographic Measures
- Storage (Permanent or Transient)

INFORMATIONAL

- Username
- User ID
- Domain Name
- Client Name
- Host Name
- Token ID

PRIVILEGE STATE

- Idle
- Booting
- Secure Mode
- Insecure Mode
- Suspended

PRIVILEGE FUNCTIONS

- Surrogate Operations
- Terminal Activation
- Intelligent Device Personalization
- Access to Resources
- Loyalty Credit Management

FIG. 6

SYSTEM AND METHOD FOR PRIVILEGE DELEGATION AND CONTROL

RELATED APPLICATIONS

This application is a continuation of U.S. application Ser. No. 10/218,642 filed Aug. 15, 2002 now U.S. Pat. No. 7,770, 212, which is hereby incorporated by reference.

FIELD OF INVENTION

The present invention relates generally to a data processing system and method and more specifically to a system and method for delegating privileges from one or more security tokens to one or more data processing units.

BACKGROUND

Privilege delegation affords the ability to allow another to act as a surrogate for the delegator. A number of different strategies are relevant to accomplish the delegation process. For example, U.S. Pat. No. 5,339,403 issued to Parker, describes a privilege attribute certificate issued by an authentication server to allow a client access to distributed resources. In a second example, U.S. Pat. No. 5,918,228 issued to Rich, et al. describes a privilege attribute certificate used to "impersonate" a client to other web-based servers. The privilege attribute certificate is generated and issued by a first web server and presented to other servers by the first server as a means to "impersonate" a client for access purposes. A popular form of privilege delegation designed for networks employing TCP/IP protocols is called Kerberos.

Kerberos authenticates the identity of users attempting to log on to a network and includes secure messaging based on symmetric cryptography methods. Kerberos works by granting users "tickets," as a form of credential which are then used to identify themselves to other network service providers. Each ticket includes information that allows another network service provider to determine that the user has been properly authenticated, analogous to a privilege attribute certificate. The proper ticket is automatically presented to the network service provider as a means to avoid multiple authentication procedures each time a different network service is attempted to be accessed.

In the above cited examples, the privilege attribute certificates or tickets are generated and controlled by the issuing servers rather than the person using the system. The person using the system must therefore trust the delegation strategies employed on the system. Secondly, the server-based systems may not provide sufficient flexibility in the delegation process where the necessary delegation criteria are role-based or rule-based rather than identity based. Lastly, the privilege attribute certificates employed in the relevant art are somewhat vulnerable to attack by a person or entity having access to the certificate generating servers.

For the foregoing reasons, there is a need to incorporate a flexible privilege delegation mechanism into one or more security tokens where the holder of the security token has greater control over the issuance and use of the delegable privileges.

SUMMARY

The present invention is directed to a privilege delegation system and method that incorporates flexibility and control over the issuance and use of the delegable privileges. The invention includes a security token having the ability to transfer delegable privileges and associated attributes to another security token or computer system either of which are described generically herein as data processing units. Various embodiments are provided including a split privilege which allows access to a controlled resource when combined with all of the components to form a complete privilege.

The receiving data processing unit includes the ability to operatively store and use the delegated privilege and perform data exchanges with the security token and optionally with at least a second data processing unit. Mutual authentications are performed between the delegating security token and receiving data processing unit before the delegated privilege is transferred.

The information that may be communicated in the data exchange includes authentication data, one or more delegated privileges and the associated attributes. A secure messaging protocol is used during the data exchanges. The delegable privileges include a privilege attribute certificate, a key component, a cryptographic key, digital ticket, digital credential, password, biometric template, digital rights, license or loyalty credit.

Typical uses for the delegated privileges include authentication, terminal activation, personalization of an intelligent device, accessing resources included in or accessible through the second data processing unit or another data processing unit, allowing the second data processing unit or another data processing unit to act as a surrogate for the delegating security token and loyalty credit management. The attributes included in the privilege attribute certificate or in the separate file define the scope of usage and security aspects required to use the delegated privilege. When the attributes are included in the separate file, a verifiable cross reference to the associated privilege is included.

The attributes associated with the delegated privilege provide sufficient information to the receiving data processing unit to configure the privilege and enforce control aspects stated in the attributes including security policies and delegated privilege state. The security policies includes details related to validity period, remaining number of uses, time limits and cryptographic measures to be employed. The delegated privilege state includes storage requirements (transient or permanent), and state of the host (idle, booting, secure mode, insecure mode, suspended.) The control aspects determine when the privilege is to be activated and destroyed. Other information included in the attributes includes operational information such as username, user ID, domain name, client name or host name.

Some advantages of the invention are illustrated below by way of example. Privilege delegation and control may be applied in maintaining the privacy of a person's medical records. A patient's medical records should only be accessible to those authorized or "privileged" to access the records. In order to access a patient's medical records, a terminal is activated by securely transferring a privilege following mutual authentications from a physician's security token to a security token associated with the terminal. The entire privilege may be transferred from the physician's security token or formed by combining the information transferred with pre-existing information contained in the terminal security token. The physician's delegated privilege allows activation of the terminal to read a patient's medical records stored in or otherwise accessible using information stored in the patient's security token.

The attributes associated with the delegated privilege may limit activation of the terminal to the physician's normal office hours and/or specify that the delegated privilege remain in transient memory only. The attributes may also provide the ability to delegate privileges to another physician while the first physician is on vacation. To access a patient's medical records, the patient presents his or her security token to the terminal. An authentication session follows which verifies to the patient's security token that the necessary privileges are present in the terminal security token to allow the terminal to access the patient's medical records. An office manager in the same office, may have a delegable privilege necessary to activate the same terminal for reviewing account balances associated with the patient but would not have the necessary delegable privilege to review the patient's medical records. A first alternative to using the split master key approach utilizes a complete master symmetric key which is installed in all role-based authorizing security tokens equivalent to the physician level example described above. In this alternative, the entire master key is transferred to the security token associated with the terminal, rather than a key component. All other aspects of the second embodiment of the invention are the same. The symmetric keys in either approach may be based on algorithms supporting the data encryption standard (DES), triple data encryption standard (3DES), advanced encryption standard (AES), etc.

A second alternative to using the split key approach involves the use of public key infrastructure (PKI) keys. In this alternative, a group private key representing a particular privilege is generated by the issuing authority and installed in all role-based authorizing security tokens equivalent to the physician level example described above. The public key counterpart to the group private key is likewise installed in all patient level security tokens equivalent to the patient security token described above. The PKI keys may based on algorithms utilizing elliptical curves, RSA, Diffie-Hellman, Pretty Good Privacy (PGP), El Gamal, etc. In all embodiments involving cryptographic key transfers, mutual authentications should be performed between the delegating and delegated security tokens to prevent unauthorized disclosure of the cryptographic keys. Authentication of the terminal by the patient data processing unit is sufficient for using the transferred privileges.

BRIEF DESCRIPTION OF DRAWINGS

A more complete understanding of the present invention may be accomplished by referring to the following Detailed Description and Claims, when viewed in conjunction with the following drawings:

FIG. 1A—is a detailed block diagram depicting a mutual authentication cycle between a security token and a first data processing unit.

FIG. 1B—is a detailed block diagram depicting privilege delegation including associated attributes from a security token to a first data processing unit.

FIG. 1E—is a detailed block diagram depicting an existing privilege contained in a first data processing unit having an expired attribute.

FIG. 1F—is a detailed block diagram depicting replacement of the expired attribute associated with the existing privilege.

FIG. 1G—is a detailed block diagram depicting a variation of the first inventive embodiment.

FIG. 1H—is a detailed block diagram depicting a transfer of a partial privilege from the security token to the first data processing unit.

FIG. 1I—is a detailed block diagram depicting the transfer of the partial privilege from the first data processing unit to the second data processing unit.

FIG. 1J—is a detailed block diagram depicting the combined partial privileges inside the second data processing unit and access to a controlled resource.

FIG. 1K—is a detailed block diagram depicting a variation of the first inventive embodiment where the second partial privilege is transferred from the second data processing unit to the first data processing unit.

FIG. 1L—is a detailed block diagram depicting the combined partial privileges inside the first data processing unit and access to a controlled resource.

FIG. 6—is a table providing a summary of the types of delegable privileges and information included in the associated attributes.

DETAILED DESCRIPTION

This invention provides novel implementations in delegating privileges and associated attributes from a security token to one or more data processing units. For purposes of this invention, the security token and data processing units are assumed to include standardized cryptography modules, algorithms and services.

The term "data processing unit" refers to a security token, an intelligent device or a computer system as appropriate. The term security token refers to hardware based security devices such as smart cards, integrated circuit cards, subscriber identification modules (SIM), wireless identification modules (WIM), identification tokens, secure application modules (SAM), hardware security modules (HSM), secure multimedia card (SMMC) and like devices. The terms data processing unit and security token are used interchangeably in the specification and no limitation is usage is implied.

Figure 1:
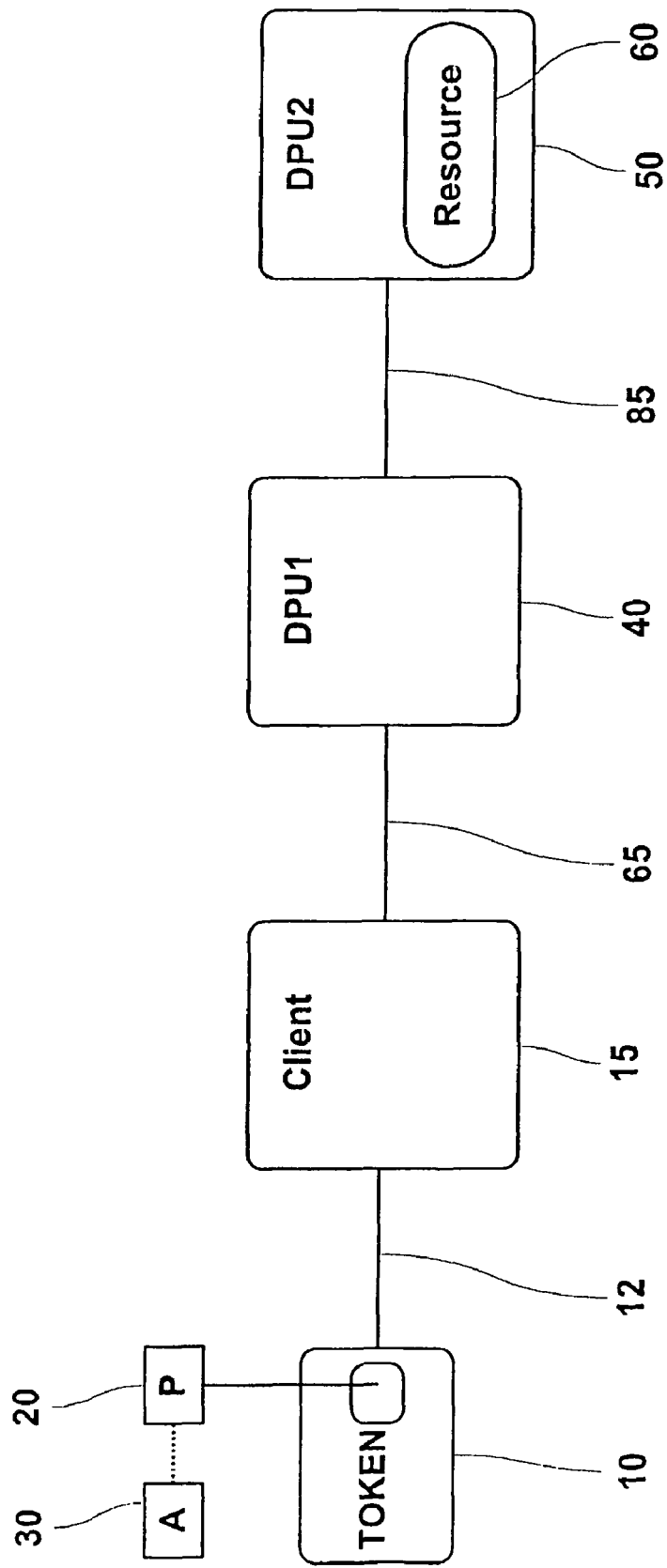
FIG. 1—is a generalized system block diagram for implementing the main embodiment of the invention.

Referring to FIG. 1, the major components and interrelationships are depicted for implementing the main embodiment of the invention. A security token 10 is shown operatively connected 12 to a client computer 15. The client computer 15 is in processing communications 65 with a first data processing unit DPU1 40. The client computer 15 provides the necessary hardware and software interfaces to allow the security token 10 to communicate with the first data processing unit DPU1 40 but otherwise does not affect the various embodiments of the invention described herein. The security token 10 includes at least one delegable privilege P 20 and its associated attributes A 30.

The delegable privilege P 20 used for authentication, terminal activation, personalization of an intelligent device, accessing resources 60 included in or accessible through a second data processing unit DPU2 50 or another data processing unit, allowing the second data processing unit DPU2 50 or another data processing unit to act as a surrogate for the delegating security token 10 or maintenance of loyalty credits.

The attributes A 30 associated with the delegated privilege P 20 provide sufficient information to a receiving data processing unit to configure the privilege P 20 and enforce control aspects stated in the attributes A 30 including security policies and delegated privilege state. The security policies include details related to validity period, remaining number of uses, time limits and cryptographic measures to be employed.

The delegated privilege state includes storage requirements (transient or permanent), and state of the host (idle, booting, secure mode, insecure mode, suspended.) The control aspects determine when the privilege is to be activated and destroyed. Other information included in the attributes A 30 includes operational information such as username, user ID, domain name, client name or host name. The Table of FIG. 6, provides a summary of the types of delegable privileges and information included in the associated attributes.

The attributes A 30 are associated with the privilege P 20 by a unique signature, hash or message authentication code or hashed message authentication which unambiguously links the attributes 30 with the privilege 20. The attributes A 30 are normally stored separately from the privilege 20 except when incorporated into certificate form (e.g. digital tickets, digital rights, license or privilege attribute certificates)

The first data processing unit DPU1 40 is in processing communications 65 with the second data processing unit DPU2 50. The second data processing unit DPU2 50 includes the resource 60 which is only accessible using the valid privilege P 20. The resource 60 is defined generically to include data or functions contained in the second data processing unit DPU2 50 or otherwise accessible from another data processing unit using the resource 60. The communications links 65 and 85 may be either local connections, remote network connections or any combination thereof.

Referring to FIG. 1A, a prerequisite mutual authentication cycle 70 is initiated before privilege transfer. Mutual authentication 70 is preferred to ensure that both the sending data processing unit and receiving data processing are authorized to perform privilege transfer transactions. In FIG. 1B, once the mutual authentication cycle is successfully completed, a secure channel is established between the security token 10 and first data processing unit DPU1 40.

The secure channel 75 may be implemented using secure messaging protocols such as secure socket layer encryption (SSL), transport layer security (TLS) or IPsec. The privilege P 20 and its associated attributes A 30 are securely sent 65 through the secure channel 75 and stored inside the first data processing unit DPU1 according to the control aspects specified by the attributes A' 30'. (The privilege P' 20' and associated attribute A' 30' are shown with the apostrophes to indicate a duplicate copy of the originals.)

Figure 1C:
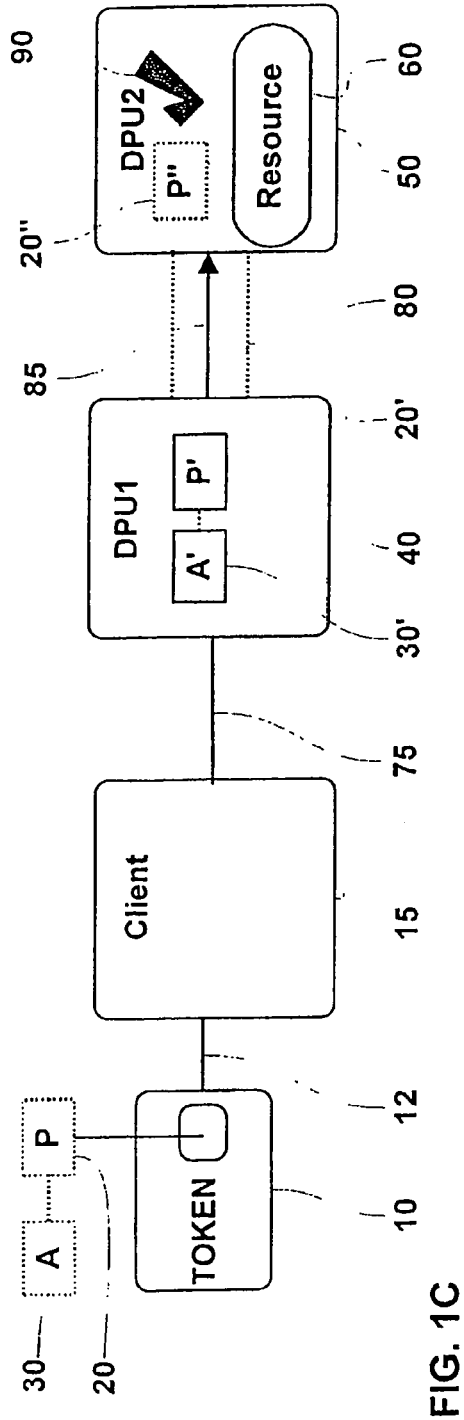
FIG. 1C—is a detailed block diagram depicting privilege verification by a second data processing unit.
Figure 1D:
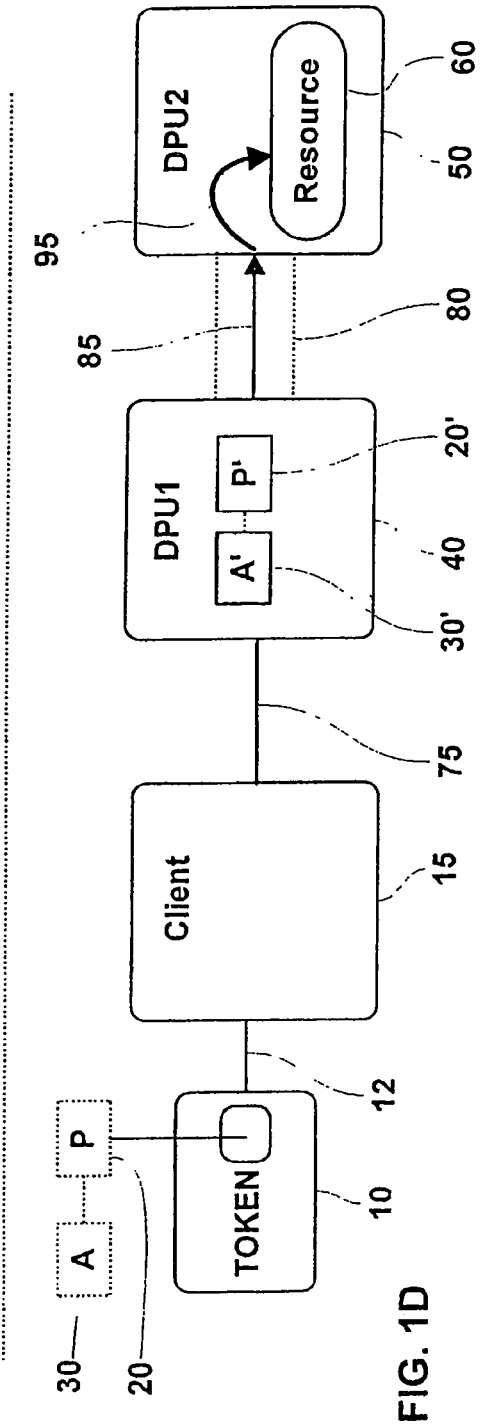
FIG. 1D—is a detailed block diagram depicting privilege usage by the first data processing unit whereby an example resource contained in a second data processing unit is accessed using the delegated privilege.

In FIG. 1C, the first data processing unit DPU1 40 authenticates itself to the second data processing unit DPU2 50 and a secure channel is established 80. The privilege P'' 20'' is securely sent 85 to the second data processing unit DPU2 50 where it is validated 90. Access and use 95 of the resource 60 is shown in FIG. 1D.

In FIG. 1E, a privilege P' 20' and its associated attributes A'x 30' are shown. The attributes A'x 30' includes a parameter which has expired (for example validity period.) In order to use the privilege, an update is required. The updated attributes A'' 30'' is securely sent from the security token 10 to the first data processing unit DPU1 40 where the expired attributes A'x 30' is replaced with the update attributes A''x 30'' as is shown in FIG. 1F.

Referring to FIG. 1G, a partial privilege p/1n 22 and its associated attributes A 30 are shown initially stored inside the security token 1. A remaining portion of the privilege p2/n 22' and its associated attributes A' 30' are shown stored inside a second security token 50. This embodiment of the invention requires that the partial privileges p1/n 22 and p2/n 22' be combined in order to gain access to a resource 60. It is envisioned by the inventor that the attributes A 30 and A' 30' may be delegated by either the security token 10 or second data processing unit 50, or combined together to form a complete set of attributes. It is also envisioned by the inventor that more than two partial privileges can be combined to form an operable privilege.

Referring to FIG. 1H, the partial privilege p1/n 22 and its associated attributes A 30 are shown being delegated 12 from the security token 10 via a client 15 to 65 a first data processing unit DPU1 40. The delegation includes a secure channel 75 to prevent unauthorized monitoring of the transaction.

In FIG. 1I, the partial privilege p1/n 22 and its associated attributes A 30 are shown being delegated 85 again from the first data processing unit DPU1 40 to the second data processing unit DPU2 50 using a secure channel 95. Continuing with FIG. 1J, the combined partial privileges p1/n 22 and p2/n 22' form a complete privilege P 24 including a complete set of associated attributes A 32, which allows access to the controlled resource 60 by the second data processing unit DPU2 50.

In FIG. 1K, an equivalent embodiment is shown where the partial privilege p2/n 22' and its associated attributes A' 30' are shown being delegated 85 from the second data processing unit DPU2 50 to the first data processing unit DPU1 40 using a secure channel 95. Continuing with FIG. 1L, the combined partial privileges p1/n 22 and p2/n 22' form a complete privilege P 24 including a complete set of associated attributes A 32, which allows access to the controlled resource 60' by the first data processing unit DPU1 40. The controlled resource 60' is shown being transferred from the second data processing unit DPU2 50 for consistency with the previous drawings only. The controlled resource 60 could remain on the second data processing unit DPU2 50 and be accessible using the communications link 85.

Figure 2:
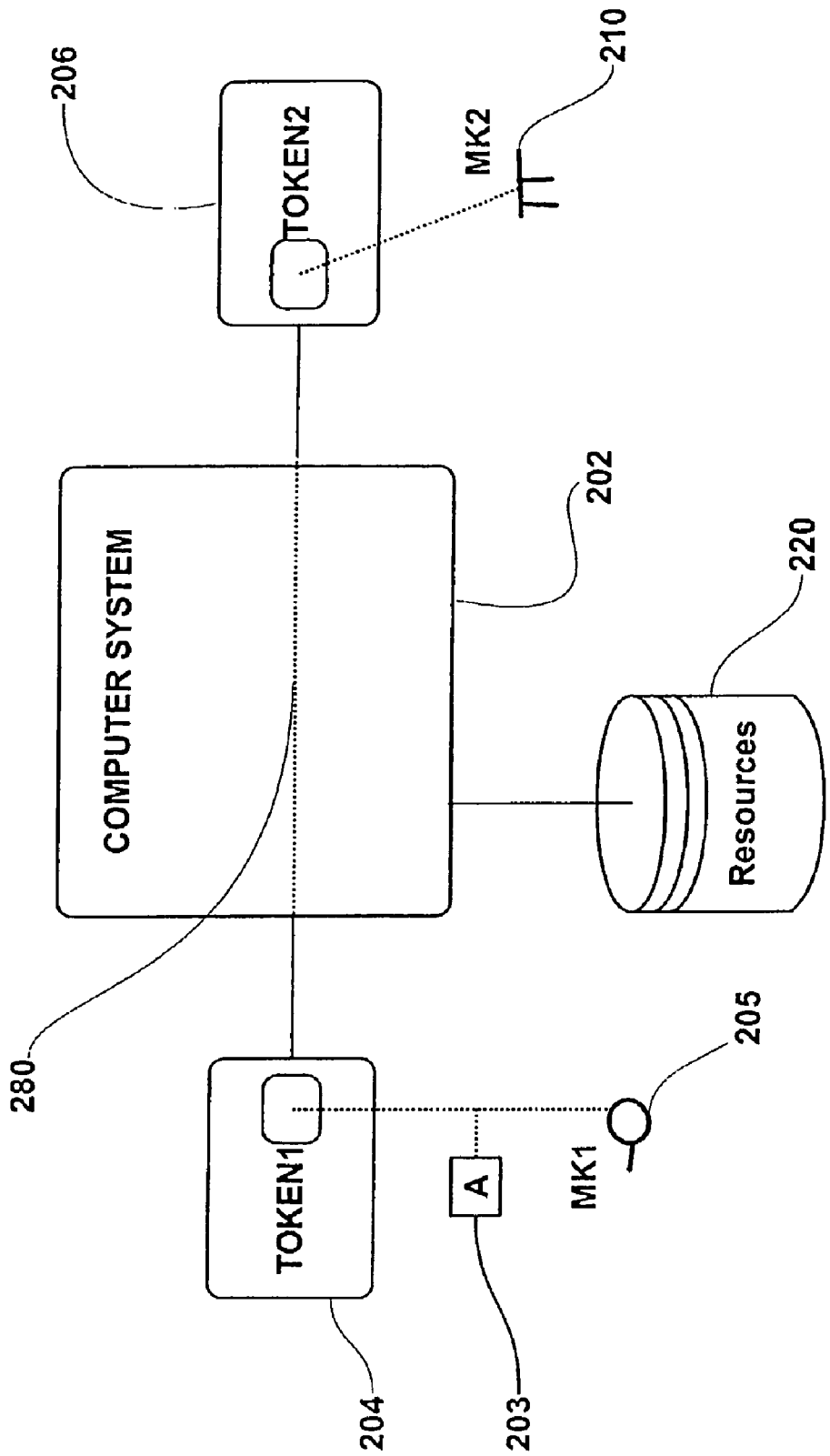
FIG. 2—is a generalized block diagram depicting an alternate embodiment of the invention using symmetric key components as a form of delegable privilege.

Referring to FIG. 2, the major components and interrelationships are depicted for implementing another embodiment of the invention. In this embodiment of the invention, privilege delegation is performed using symmetric cryptographic keys. A computer system 202 is shown operatively connected to a first security token 204 and second security token 206. A middleware program (not shown) installed in the computer system 202 supports the use of two or more data processing units. An example of which is described in "Government Smart Card Interoperability Specification Contract Modification," contract number GS00T00ALD0208 PS02, Aug. 29, 2000 and is herein incorporated by reference.

The symmetric cryptography methods employed in this embodiment of the invention may be based on algorithms supporting the data encryption standard (DES), triple data encryption standard (3DES) or advanced encryption standard (AES.)

To practice this embodiment of the invention, an issuing authority initially generates a master key associated with a particular privilege. Separate master keys may be used to define a specific privilege within a select group of data processing units. The master key is then sequentially diversified with unique identifiers associated with a pre-defined group of security tokens, forming unique privilege keys. The privilege keys will be used to verify that another security token, generally associated with a terminal, has the required privilege before allowing access to a controlled resource 220. The resulting privilege key(s) are then injected into the security token(s) by the issuing authority. The master key(s) are then diversified using a key splitting mechanism and installed in the designated data processing units, shown in FIG. 1 as TOKEN 1 204 and TOKEN 2 206.

The first security token TOKEN1 204 includes the key component MK1 205. The second security token TOKEN2 206 includes the counterpart to the key component MK2 210 and the means to combine the two key components to form the complete master key. The reconstructed master key is intended to be maintained in transient memory of the second security token 206 to prevent unauthorized disclosure as prescribed by attributes A 203 associated with the key component privilege MK1 205. Any tampering with the security token containing the master key results in the destruction of the master key. Controlled resources 220 associated with the computer system 202 are shown as a database for example only and is accessible only after privilege verification using a third data processing unit.

Figure 2A:
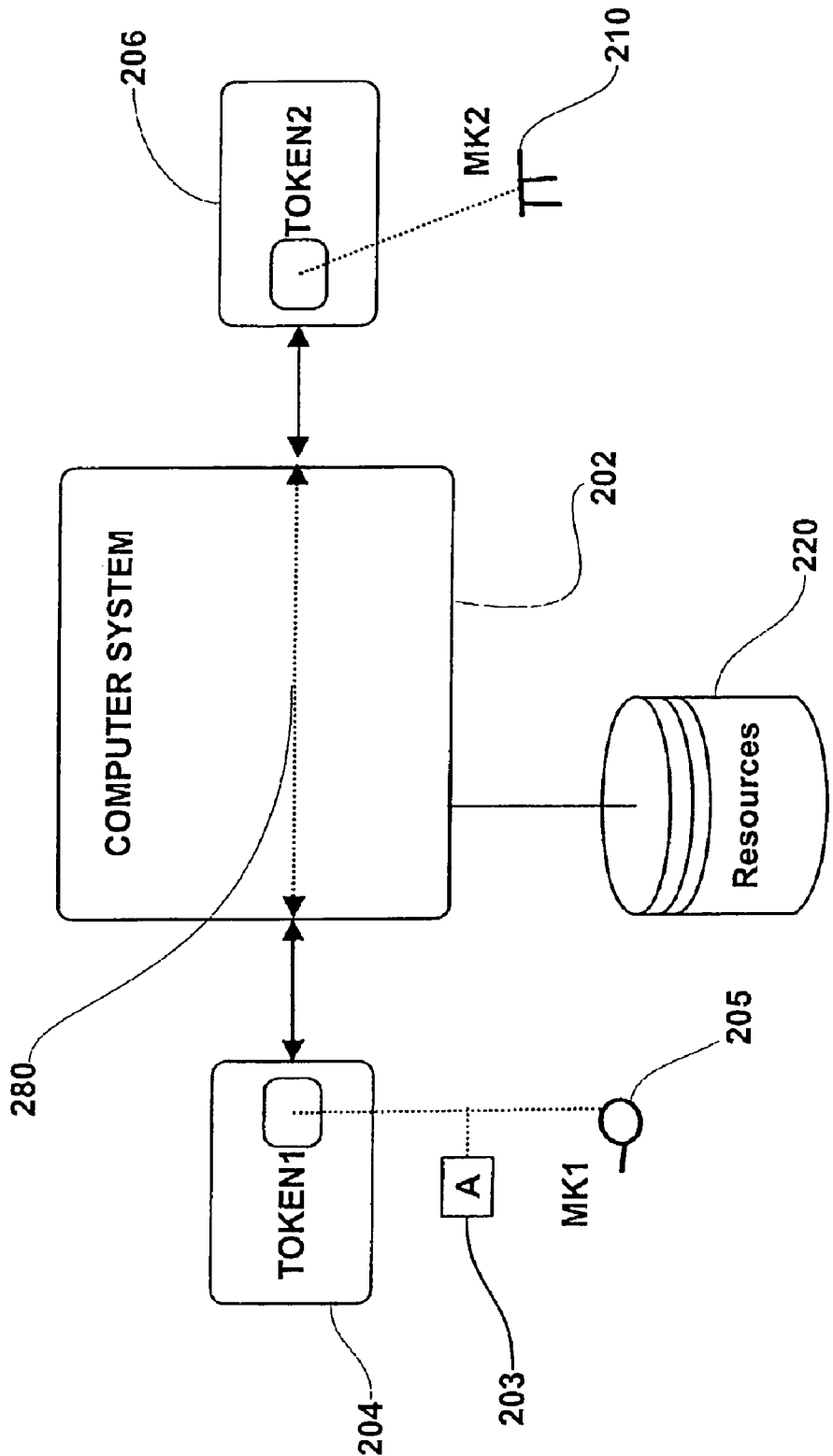
FIG. 2A—is a detailed block diagram depicting a mutual authentication cycle between a first and a second data processing unit.

In FIG. 2A, the mutual authentication 280 cycle is performed as described above before privilege transfer. Mutual authentication 280 is preferred to ensure that both the sending data processing unit and receiving data processing are authorized to perform privilege transfer transactions.

In the preferred embodiment of the invention, secure mutual authentications are performed using the mechanism described in co-pending U.S. patent application Ser. No. 10/058,734, "A System And Method For Performing Mutual Authentication Between Security Tokens," filed on Jan. 30, 2002 and assigned to a common assignee and herein incorporated by reference. Standard challenge/response authentication mechanisms may be employed as well.

Figure 2B:
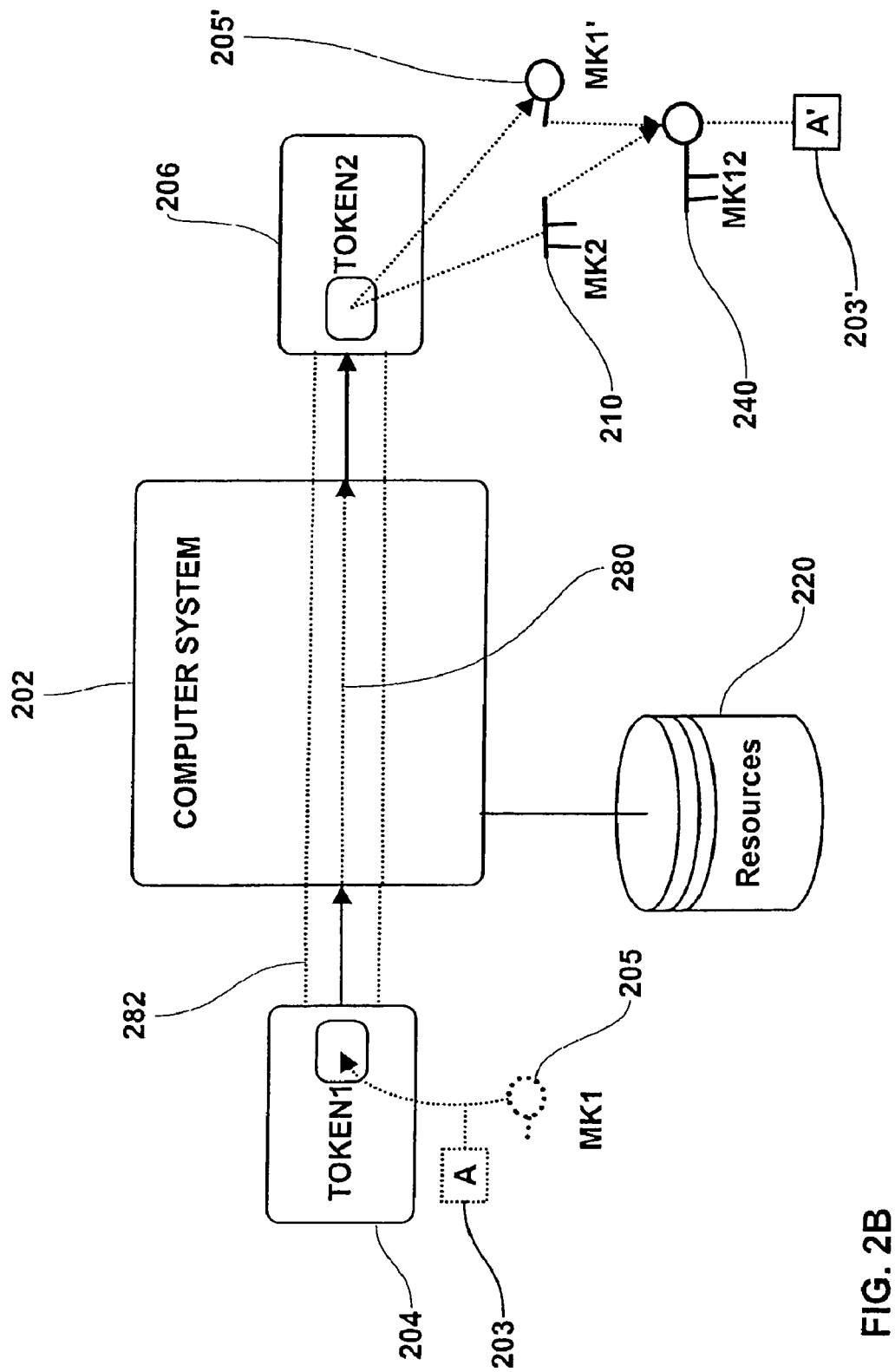
FIG. 2B—is a detailed block diagram depicting privilege delegation from the first data processing unit to the second data processing unit using a secure messaging protocol and symmetric master key regeneration.

The transfer of the key component MK1 205 and its associated attributes A 203 from the first security token TOKEN1 204 to the second security token 206 is depicted in FIG. 2B. The second security token TOKEN2 206 assembles the pair of key components MK1', MK2 205', 210 reconstructing the master key MK12 240. The operable master key MK12 240 is stored in volatile memory of the second security token TOKEN2 206 as prescribed by the associated attributes A' 203'. A secure channel 282 is employed during the key component transfer process.

Figure 2C:
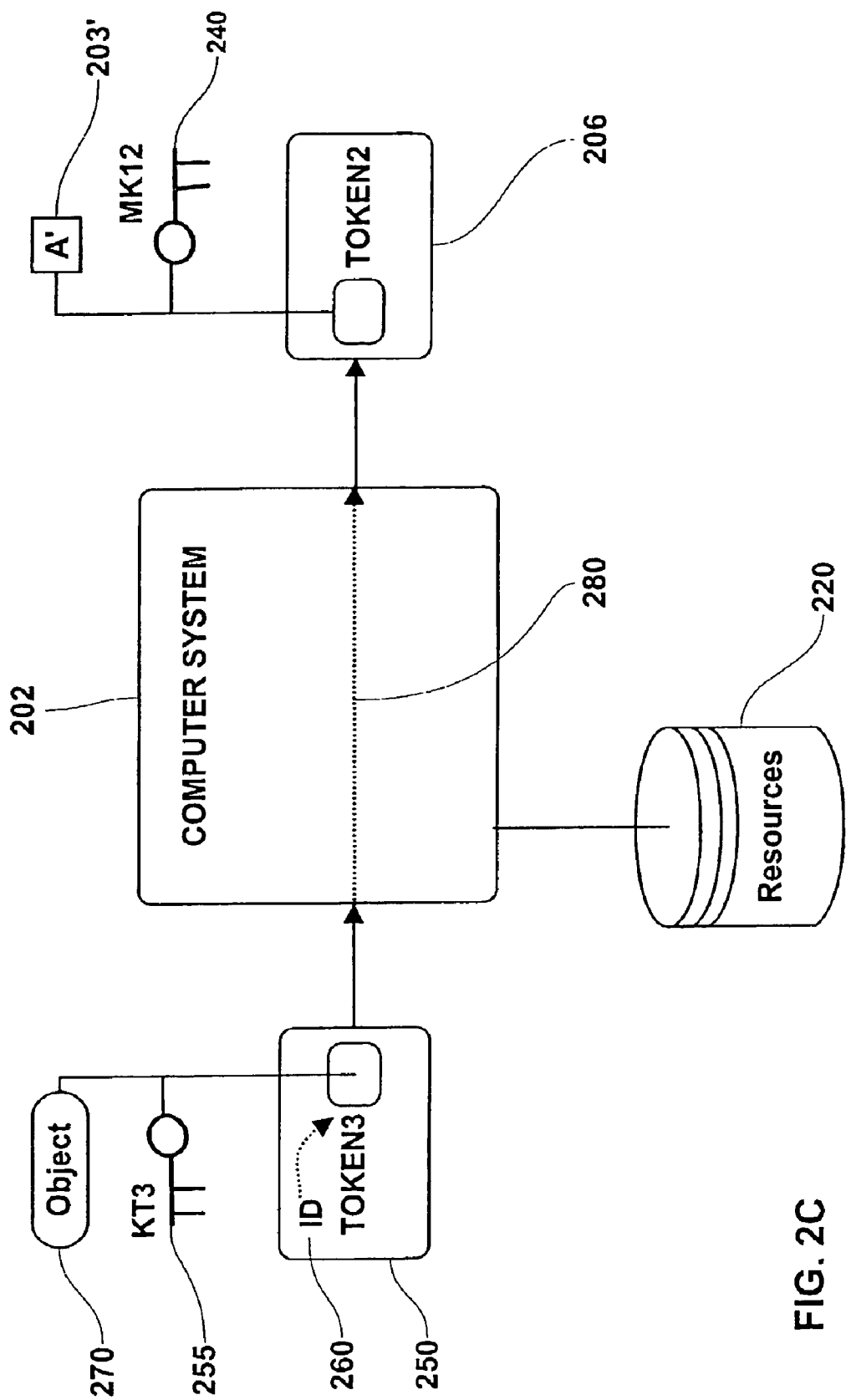
FIG. 2C—is a detailed block diagram depicting a unique identifier sent from a third data processing unit to the data processing unit as part of an authentication challenge.

In FIG. 2C, a third security token TOKEN3 250 replaces the first security token. TOKEN1 204. The third security token TOKEN3 250 includes a privilege key KT3 255 which was derived from the master key MK12 240 by diversifying the master key MK12 240 using a unique identifier ID 260 associated with the third security token 250. The privilege key KT3 255 was generated and injected into the third security token TOKEN3 250 at time of issuance by the issuing authority. Each security token included in the defined privilege group has an operatively installed privilege key derived and installed in the same manner. To regenerate the privilege key, the unique identifier ID 260 is sent 280 as part of an authentication challenge from the third security token 250 to the second security token 206.

Figure 2D:
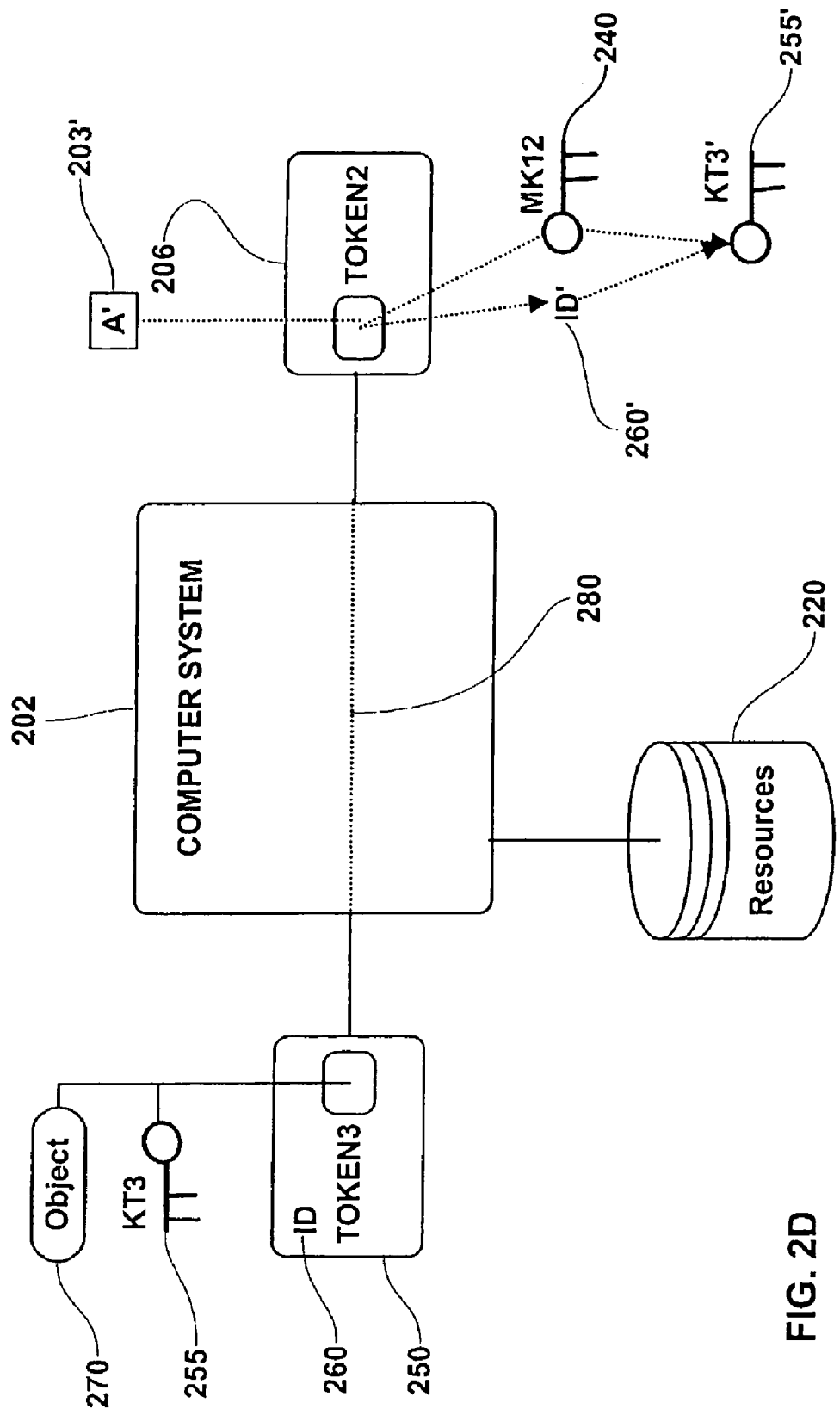
FIG. 2D—is a detailed block diagram depicting master key diversification using the unique identifier to generate a data processing unit specific key necessary to access resources controlled by the third data processing unit.
Figure 2E:
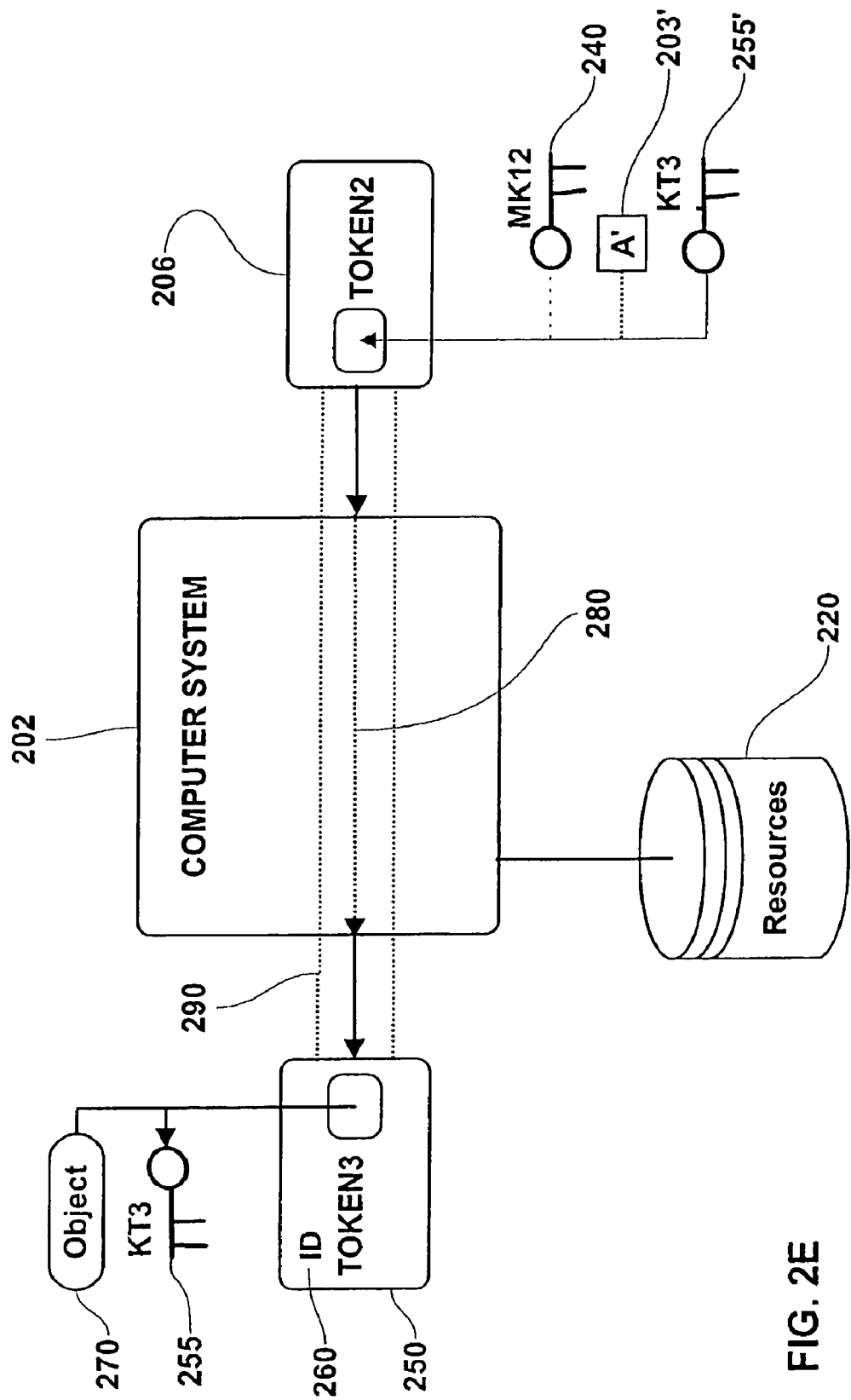
FIG. 2E—is a detailed block diagram depicting response to the authentication challenge which incorporates the use of the data processing unit specific key.

In FIG. 2D, the second security token TOKEN2 206 diversifies the master key MK12 240 with the received unique identifier ID' 260' and reconstructs the privilege key KT3' 255'. The reconstructed privilege key KT3' 255' is likewise maintained in volatile memory as prescribed by the associated attributes A' 203'. The reconstructed privilege key KT3' 255' is used to generate a response to the challenge issued by the third security token TOKEN3 250 as is shown in FIG. 2E.

Figure 2F:
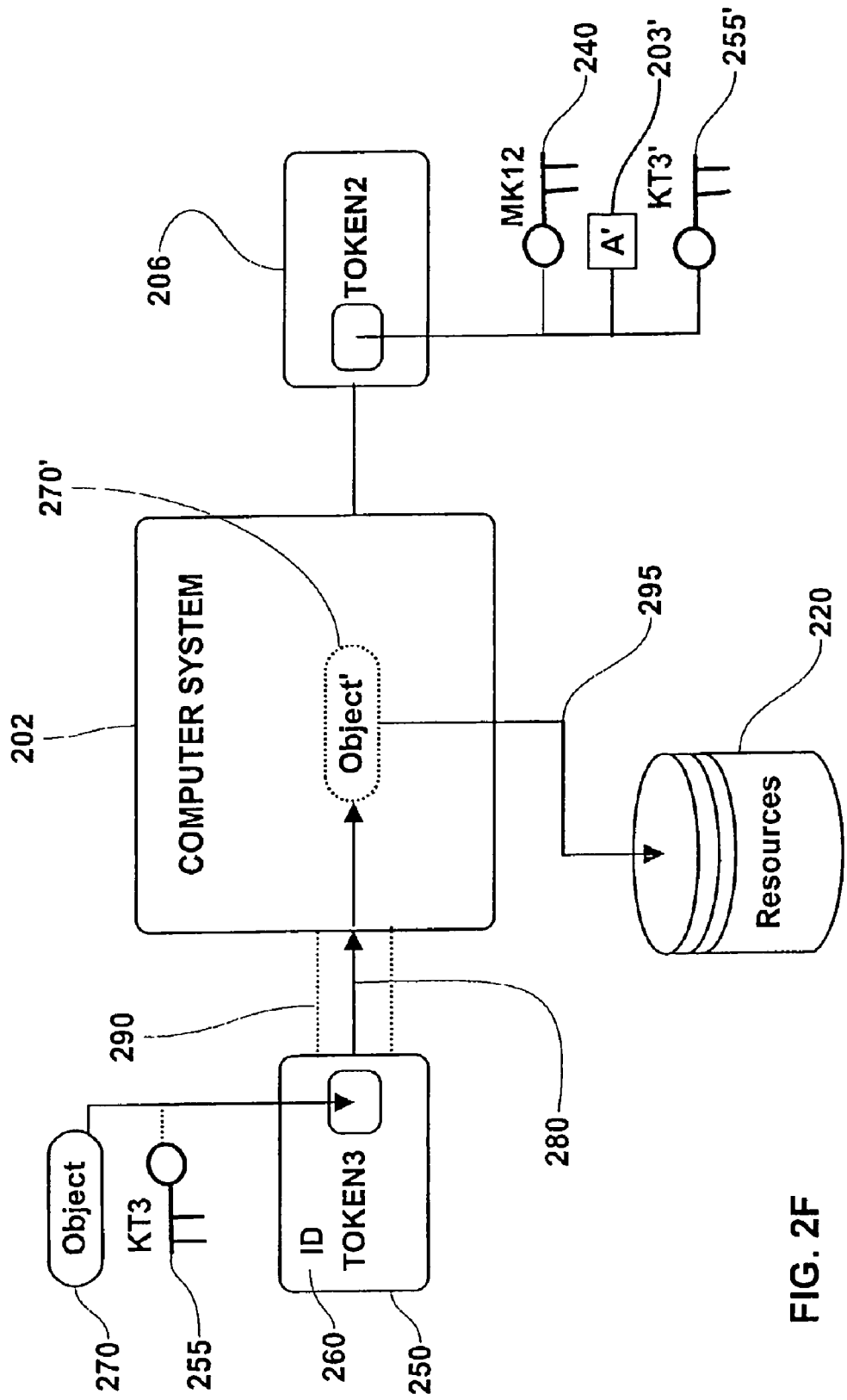
FIG. 2F—is a detailed block diagram depicting access to the resources controlled by the third data processing unit following authentication of the second data processing unit by the third data processing unit.

In FIG. 2F, the successful authentication proves to the third security token that a valid privilege exists in the second security token TOKEN2 206 which allows access to the controlled resources 220 by either providing information necessary to access a specific record 295 (e.g. social security number) or allowing access and transfer of a cryptographic key necessary to unlock the controlled resource as represented by an object' 270'. A secure channel 290 is employed during any object' 270' transfer process.

Figure 3:
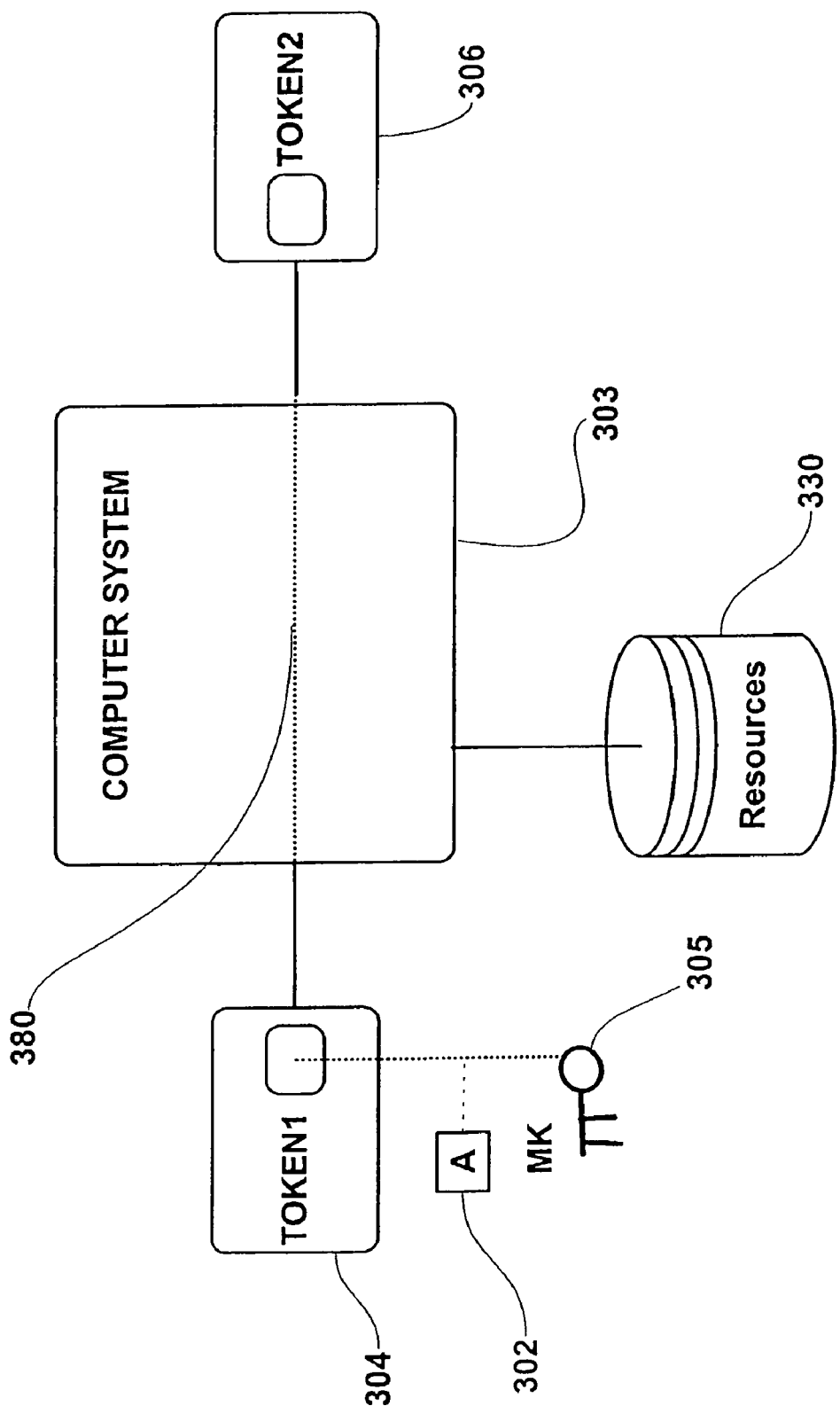
FIG. 3—is a generalized block diagram depicting an alternate embodiment of the invention using a complete symmetric key as a form of delegable privilege.

Referring to FIG. 3, another embodiment of the invention is depicted where a complete master key MK 305 representing a delegable privilege and associated attributes A 302 are shown. The master key MK 305 and its associated attributes A 302 are securely stored inside a first security token TOKEN1 304 and operatively connected 380 to a client computer system 303. A second security TOKEN2 306 is likewise operatively connected 380 to a client computer system 303 and in processing communications with the first security token TOKEN1 304. A controlled resources 330 associated with the computer system 303 is shown as a database (for example only) and is accessible only after privilege verification using a third security token.

Figure 3A:
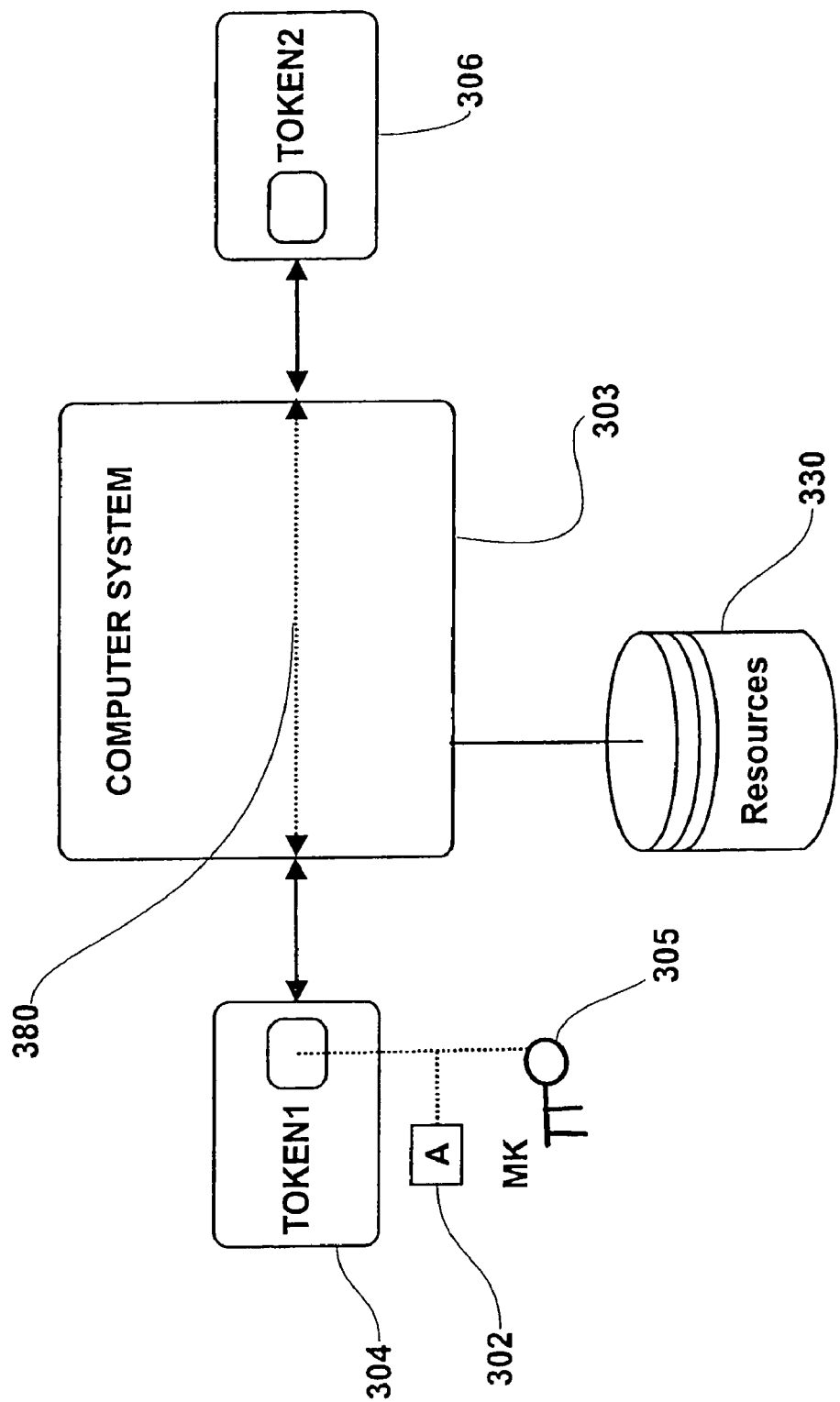
FIG. 3A—is a detailed block diagram depicting a mutual authentication cycle between a first data processing unit and a second data processing unit.
Figure 3B:
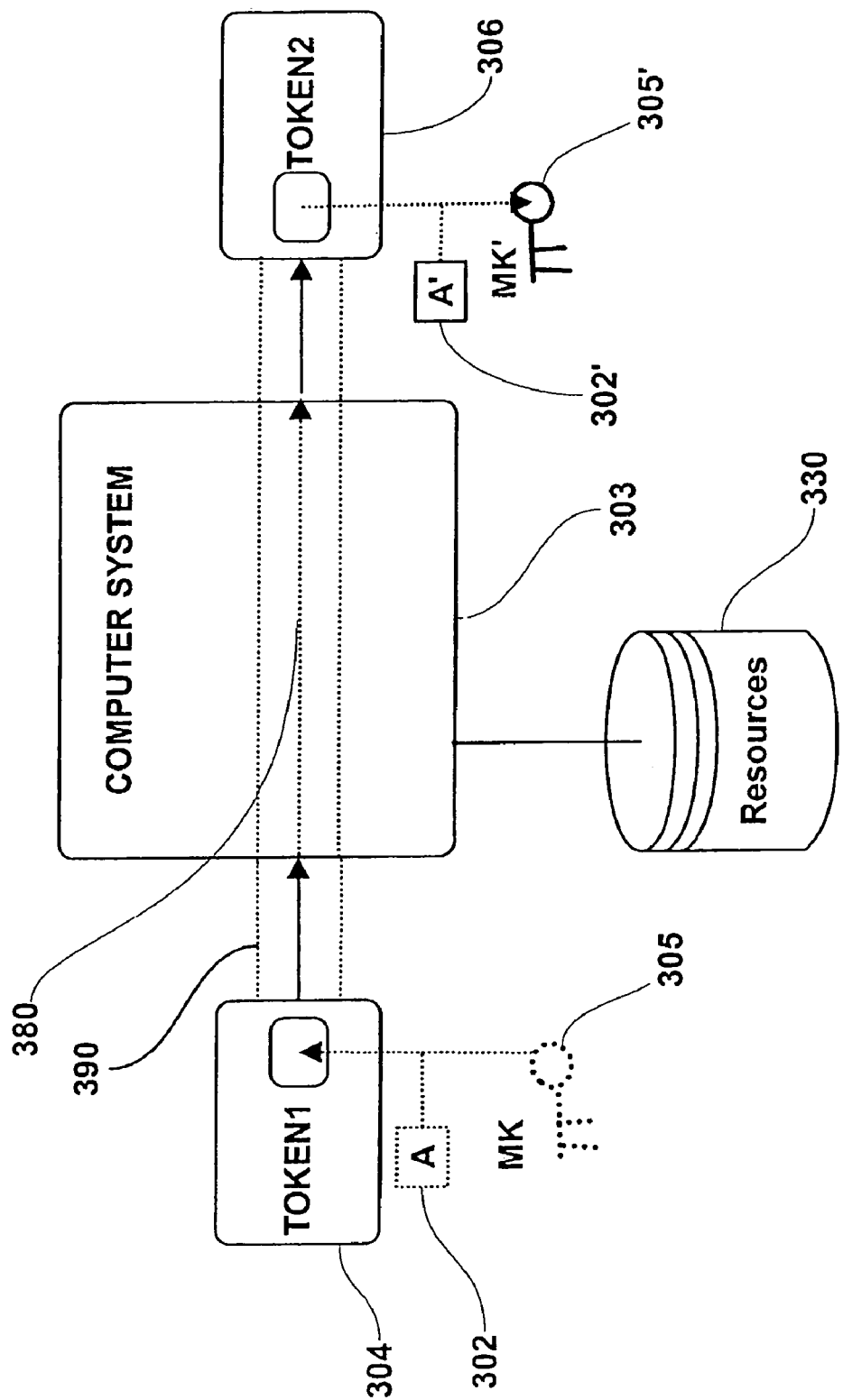
FIG. 3B—is a detailed block diagram depicting privilege delegation from the first data processing unit to the second data processing unit using a secure messaging protocol.

Referring to FIG. 3A, the prerequisite mutual authentication 380 cycle as described above, is initiated before privilege transfer. The transfer of the master key MK 305 and its associated attributes A 302 from the first security token 304 to the second security token 306 is depicted in FIG. 3B. The second security token 306 operatively stores the received master key MK 305 in volatile memory as prescribed by the associated attributes A' 302'. A secure channel 390 is employed during the master key transfer process. Additional aspects for using the symmetric master key are identical to those described above for the component key part.

Figure 4:
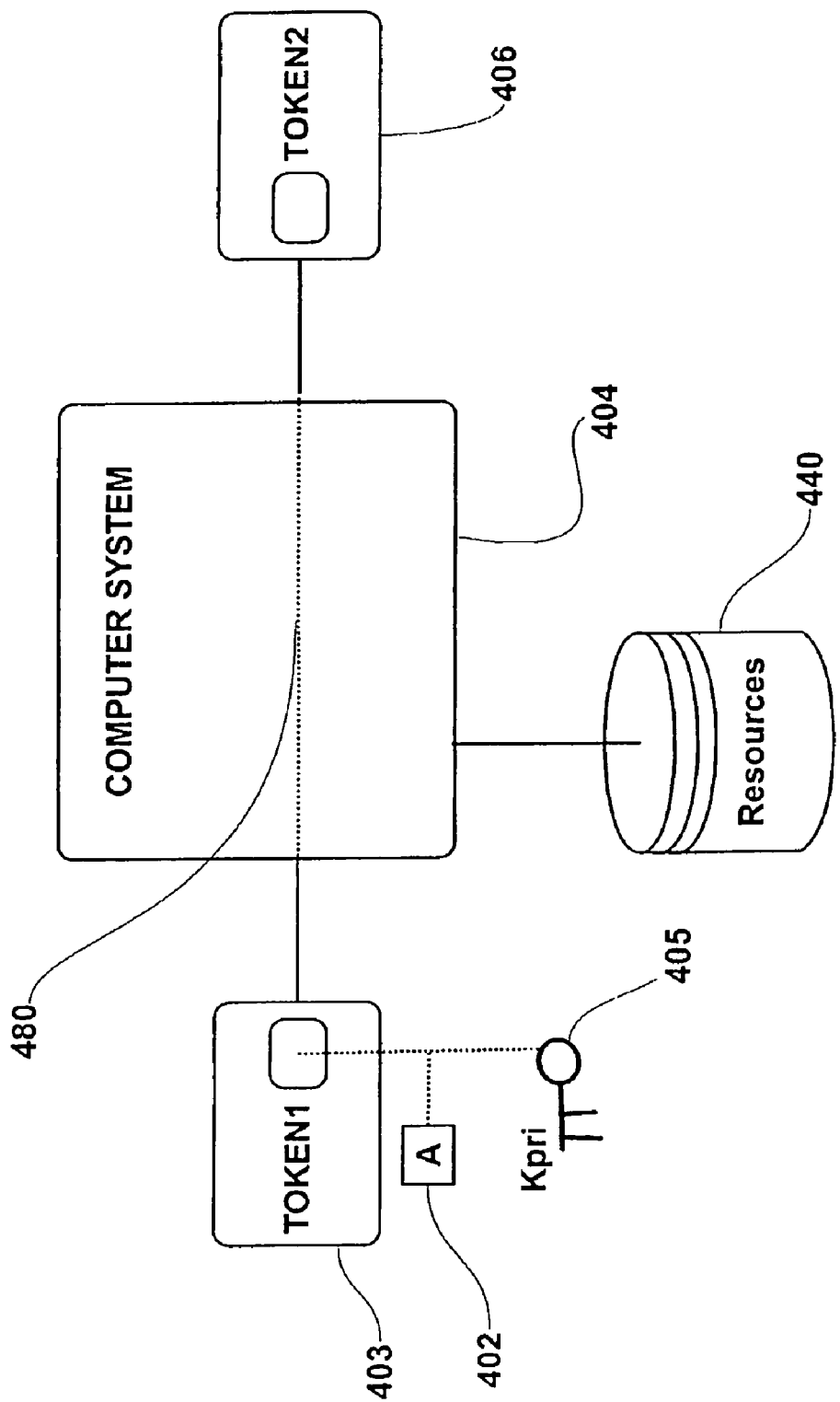
FIG. 4—is a generalized block diagram depicting an alternate embodiment of the invention using a group asymmetric private key as a form of delegable privilege.

Referring to FIG. 4, another embodiment of the invention is depicted where a group private key Kpri 405 representing a particular privilege and associated attributes A 402 are generated by an issuing authority and installed in the first security token TOKEN1 403. The first security token is operatively connected 480 to a client computer system 404.

A second security TOKEN2 406 is likewise operatively connected 480 to the client computer system 404 and in processing communications with the first security token TOKEN1 403. A controlled resources 440 associated with the computer system 404 is shown as a database (for example only) and is accessible only after privilege verification using a third security token. The public key counterpart to the group private key is likewise installed in all user level security tokens. The PKI keys may based on algorithms utilizing elliptical curves, RSA, Diffie-Hellman, Pretty Good Privacy (PGP), El Gamal, etc.

Figure 4A:
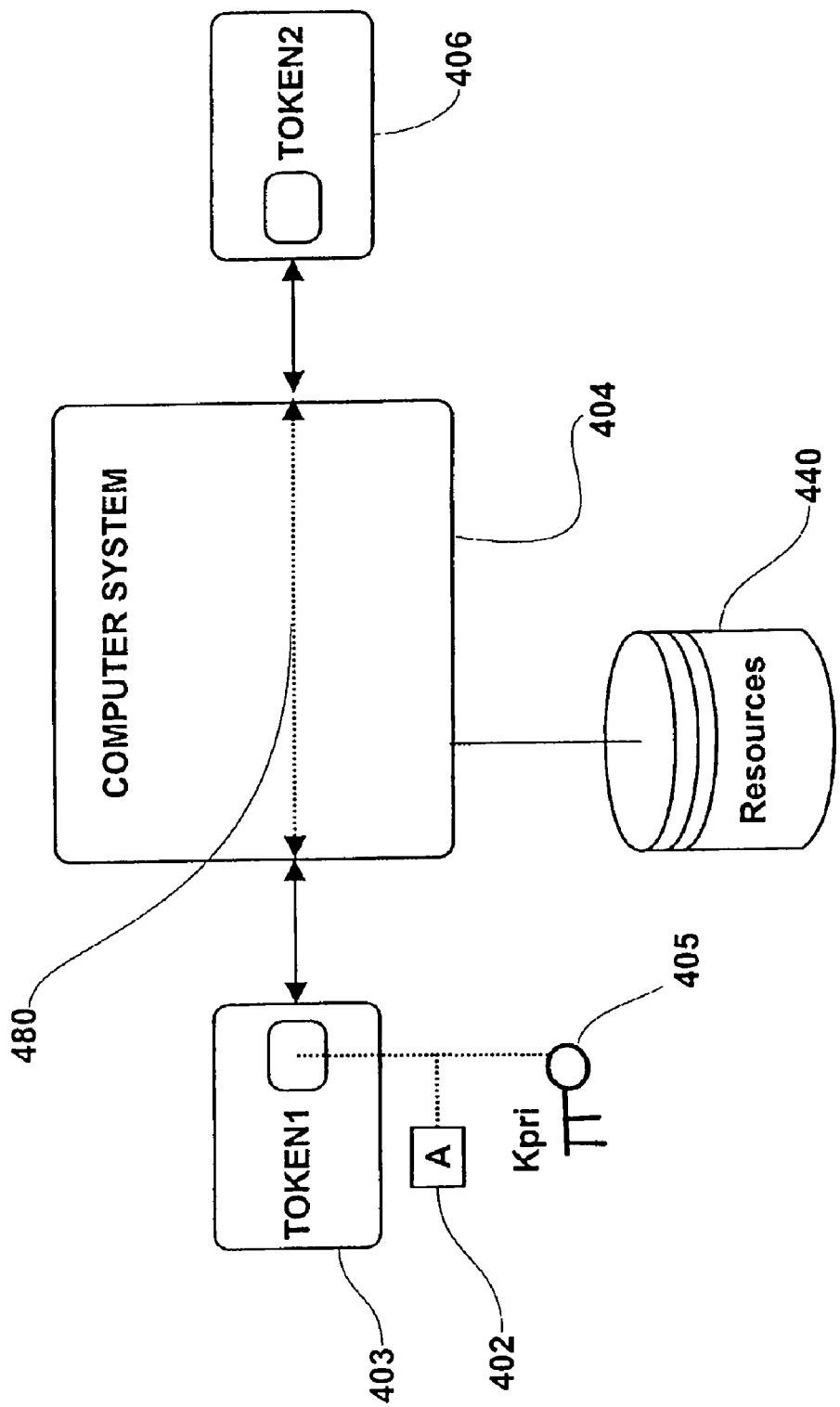
FIG. 4A—is a detailed block diagram depicting a mutual authentication cycle between a first data processing unit and a second data processing unit.
Figure 4B:
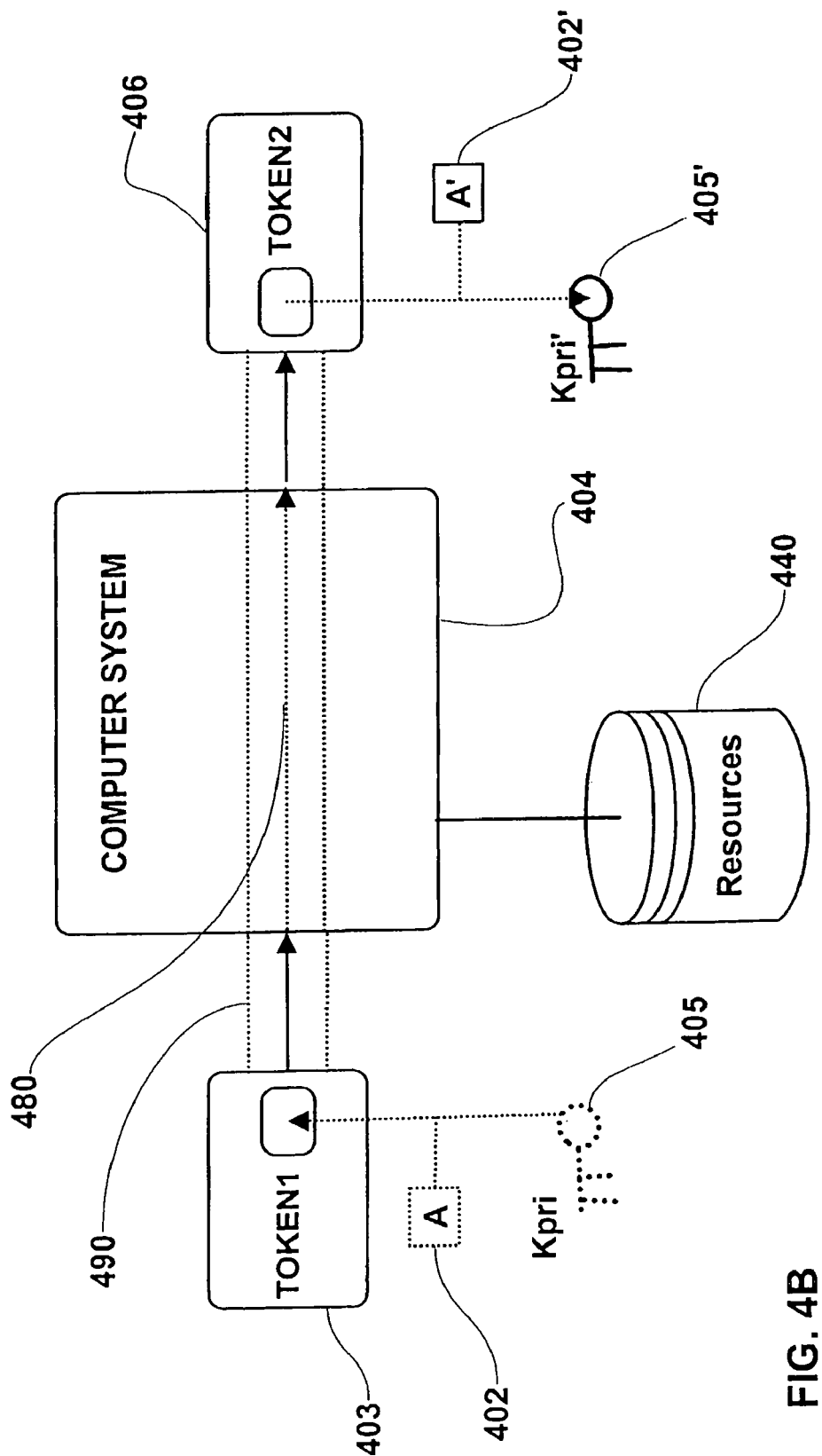
FIG. 4B—is a detailed block diagram depicting privilege delegation and its associated attributes from the first data processing unit to the second data processing unit using a secure messaging protocol.

Referring to FIG. 4A, the mutual authentication 480 cycle as described above, is initiated before privilege transfer. The transfer of the private key Kpri 405 and its associated attributes A 402 from the first security token TOKEN1 403 to the second security token TOKEN2 406 is depicted in FIG. 4B. The second security token 406 operatively stores the received private key Kpri 405 in volatile memory as prescribed by the associated attributes A' 402'. A secure channel 490 is employed during the private key transfer process.

Figure 4C:
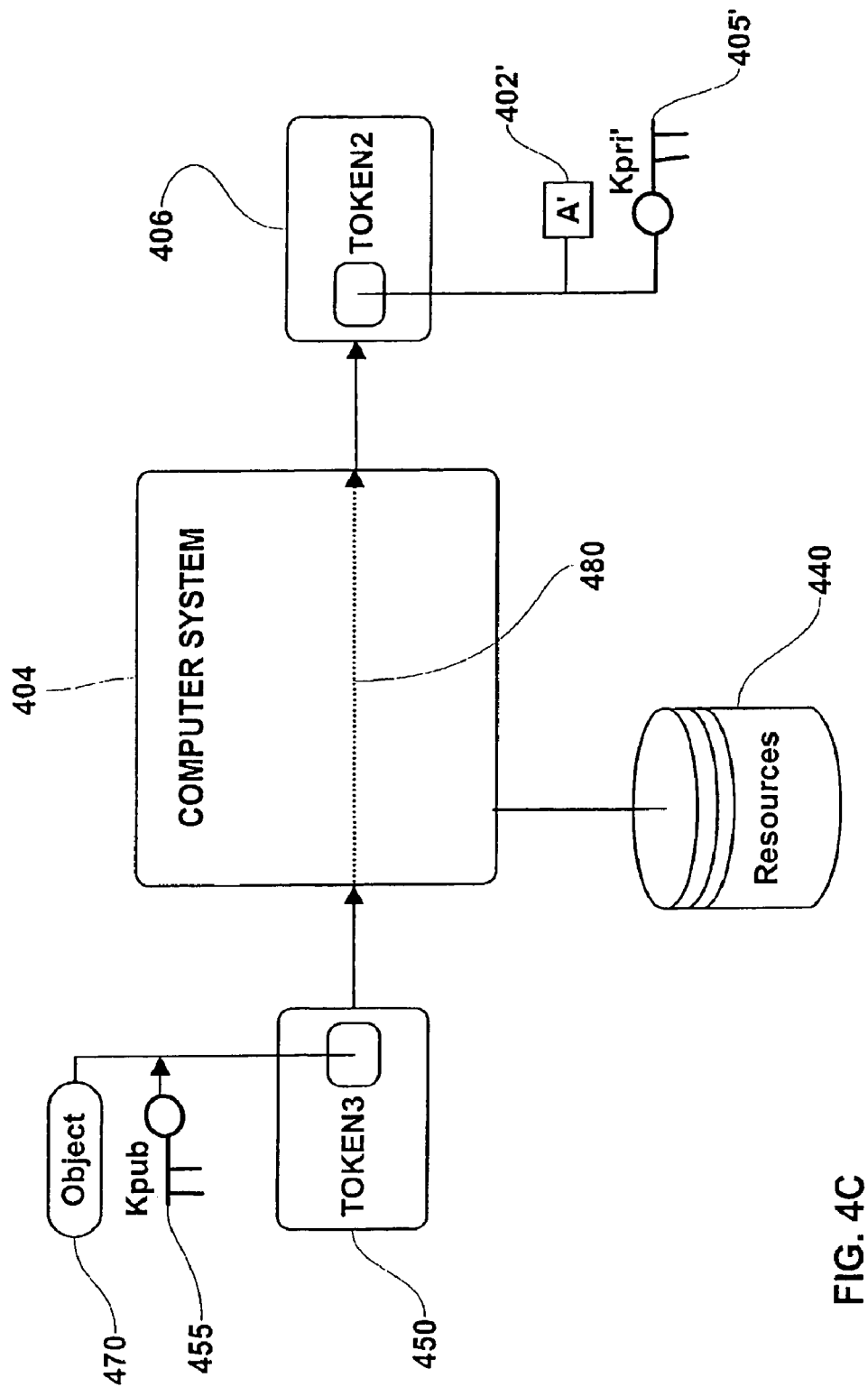
FIG. 4C—is a detailed block diagram depicting an authentication challenge sent from a third data processing unit to the second data processing unit using a public key counterpart to the group private key.

In FIG. 4C, a third security token TOKEN3 450 replaces the first security token TOKEN1 403. The third security token TOKEN3 450 includes a public key Kpub 455 which is the counterpart to the private key Kpri' 405'. The public key Kpub 455 was generated and injected into the third security token TOKEN3 450 at time of issuance by the issuing authority. Each security token included in the defined privilege group has an operatively installed public key installed in the same manner. An authentication challenge is generated by the third security token TOKEN3 450 which incorporates the use of the public key Kpub 455. The challenge is sent 480 to the second security token TOKEN2 406.

Figure 4D:
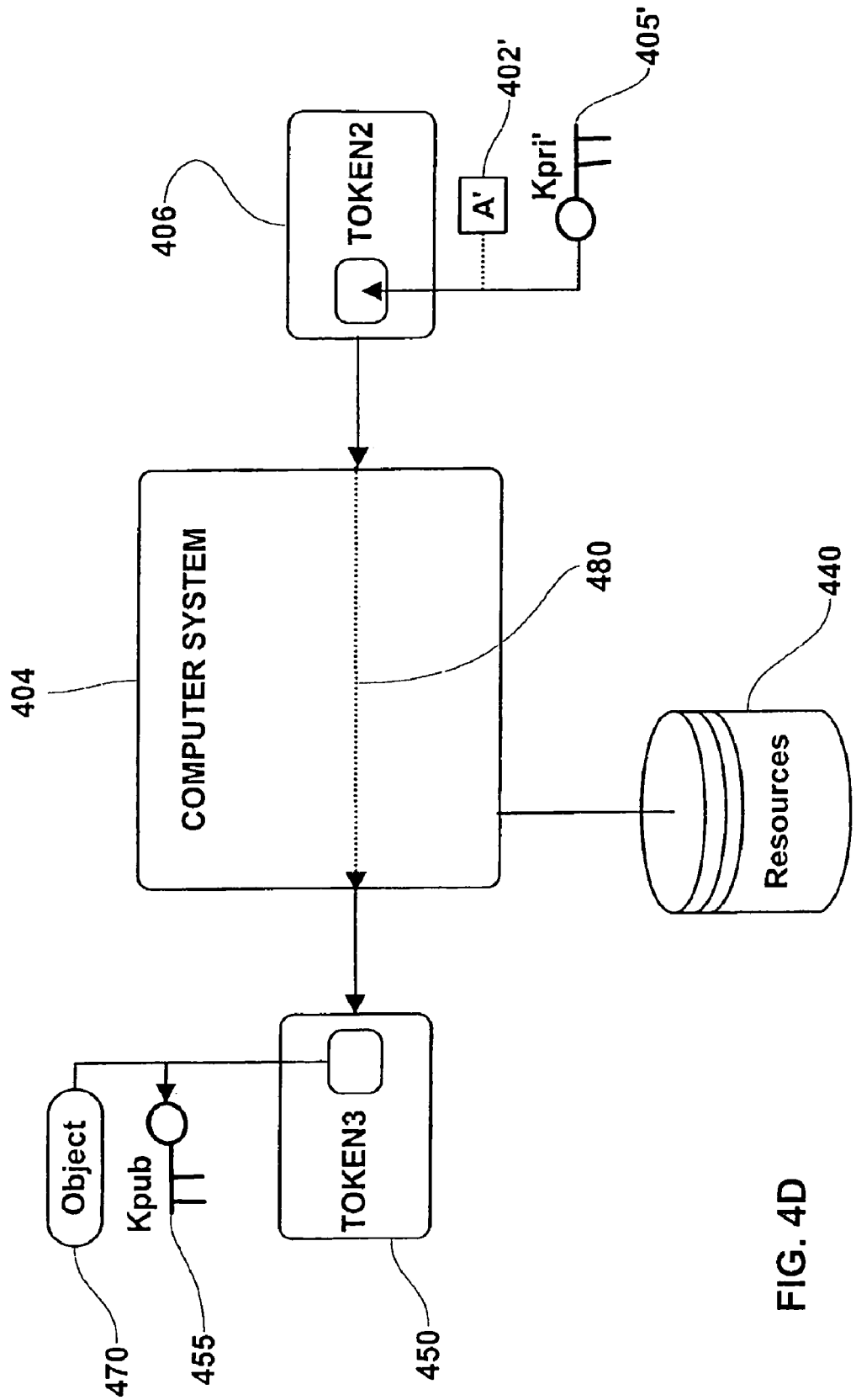
FIG. 4D—is a detailed block diagram depicting response to the authentication challenge which incorporates the use of the group private key.

In FIG. 4D, the second security token TOKEN2 406 receives the authentication challenge and generates a response which incorporate the use of the group private key Kpri' 405'. The response is sent 480 to the third security token TOKEN3 450 for authentication.

Figure 4E:
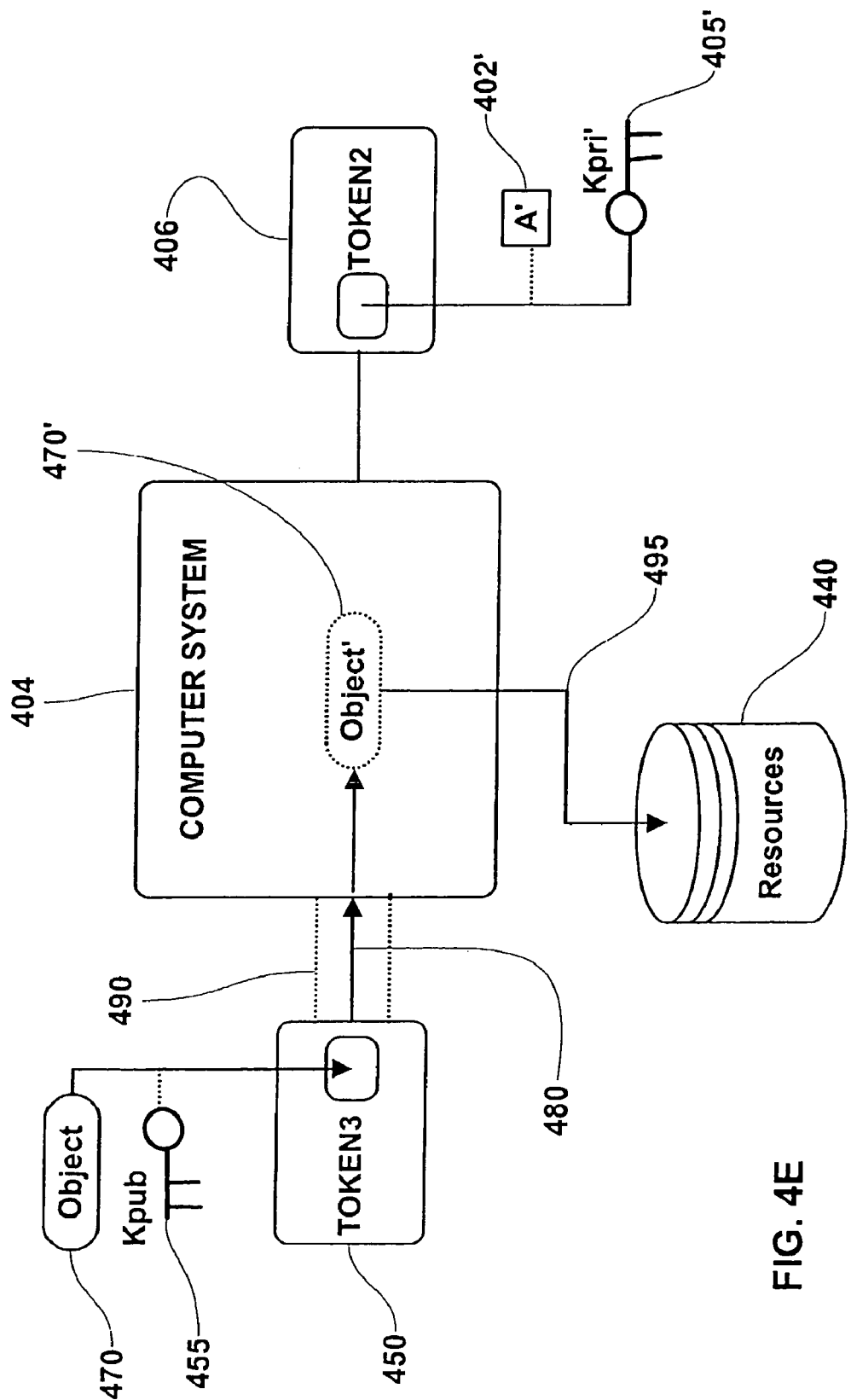
FIG. 4E—is a detailed block diagram depicting access to the resources controlled by the third data processing unit following authentication of the second data processing unit by the third data processing unit.

In FIG. 4E, the successful authentication proves to the third security token TOKEN3 450 that a valid privilege exists in the second security token TOKEN2 406 which allows access to the controlled resources 440 by either providing information necessary to access a specific record 495 (e.g. social security number) or allowing access and transfer of a cryptographic key necessary to unlock the controlled resource as represented by an object' 470'. A secure channel 490 is employed during any object' 270' transfer process.

Figure 5:
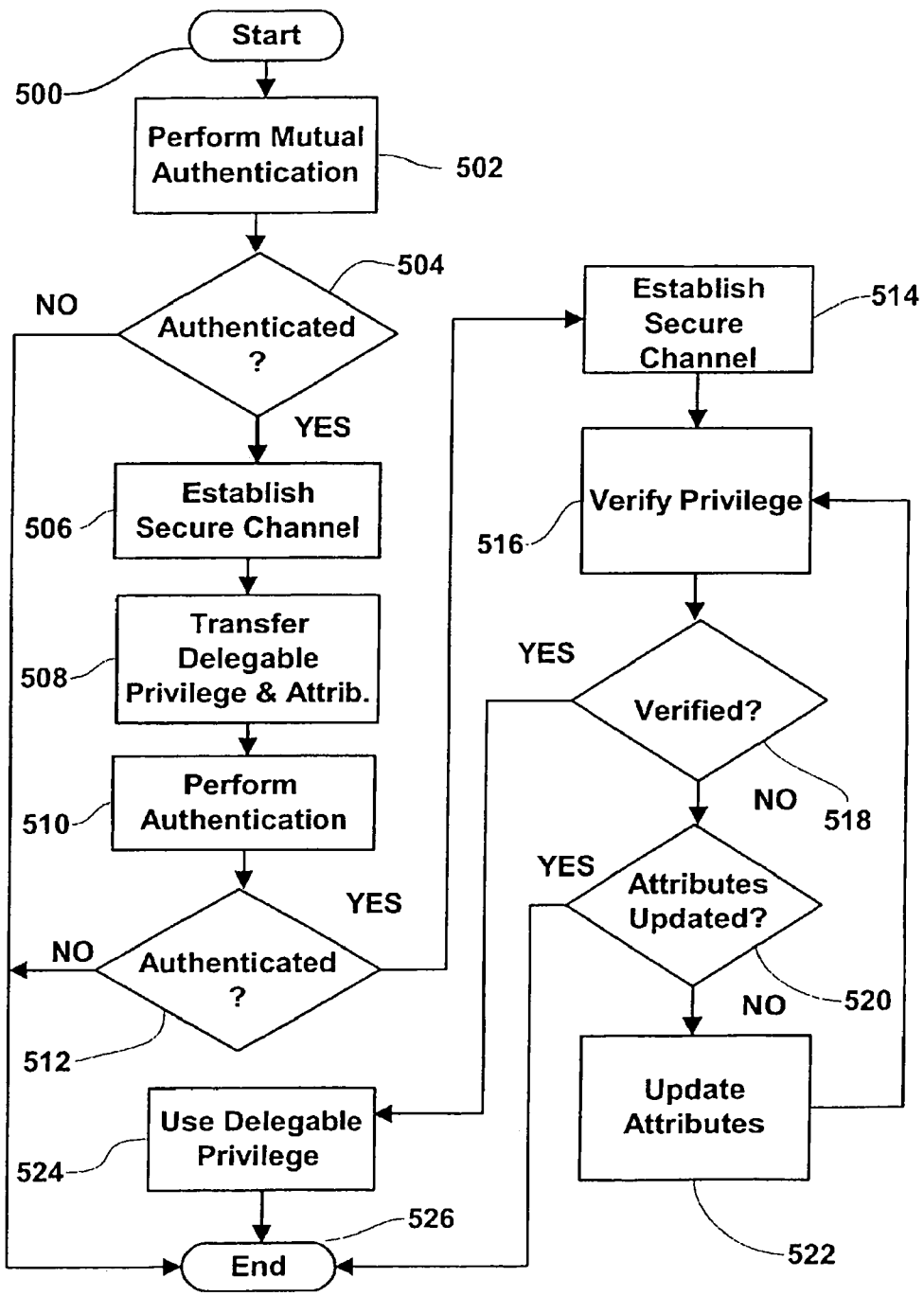
FIG. 5—is a simplified flow chart that illustrates the steps involved in implementing the main embodiment of the invention.

Referring to FIG. 5, a simplified flowchart is presented which provides the steps necessary to implement the invention. The process is initiated 500 by performing mutual authentications 502 between a delegating security token and a first data processing unit 502.

If either part of the mutual authentication cycle fails 504, the privilege delegation process ends 526. If the authentication process is successful 504, a secure channel is established 506 and the delegable privileges and associated attributes are transferred from the security token to the receiving data processing unit 508. In order to use the privilege, the receiving data processing unit is authenticated 510 by a second data processing unit. If the authentication process is successful 512, a secure channel is established 514 and the delegable privilege is verified by the second data processing unit 516. If the authentication process is unsuccessful 512, the privilege delegation process ends 526.

If the verification process is successful 518, access and use of the delegable privilege is afforded 524. If the verification process is unsuccessful 518, the attributes associated with the privilege are updated 520 and the verification process reattempted 516. If the verification process is successful 518, access and use of the delegable privilege is afforded 524 as prescribed by the associated attributes. If the verification process fails a second time, the privilege delegation process ends 526.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that this Detailed Description limit the scope of invention, but rather by the Claims that follow herein.

What is claimed:

1. A method for transferring a cryptographic key and its usage policies from a hardware security token to at least a first data processing unit, comprising:

performing mutual authentication between the hardware security token and the first data processing unit by exchanging data therebetween;

following performing mutual authentication, transferring the key from the hardware security token to a first data processing unit; and applying the key in accordance with the usage policies, wherein the key enables access to at least one resource by the first data processing unit subject to requirements prescribed in the usage policies only if the key is present in the first data processing unit and verified by at least a second data processing unit and wherein the key facilitates the at least first data processing unit to perform a function selected from the group consisting of: surrogate operations for the hardware security token, terminal activation, personalization of an intelligent device, access to the at least one resource, and loyalty credit management.

2. The method according to claim 1 wherein the hardware security token is a hardware device which has the key, the usage policies, and a transfer section that transfers the key to said at least a first data processing unit.

3. The method according to claim 1 wherein the first data processing unit includes a key application section that applies the key in accordance with the requirements prescribed in the usage policies.

4. The method according to claim 1 wherein the hardware security token includes a communications section that provides a secure messaging protocol.

5. The method according to claim 1 wherein the key is updateable by replacement of at least a portion of the usage policies with one or more new usage policies.

6. The method according to claim 1 wherein the at least a first data processing unit is an intelligent device.

7. The method according to claim 1 wherein said at least a first data processing unit is another hardware security token.

8. The method according to claim 1 wherein said usage policies include control aspects.

9. The method according to claim 8 wherein the control aspects includes security policies.

10. The method according to claim 9 wherein the control aspects includes at least one privilege state.

* * * * *